US 7,403,308 B2

(12) United States Patent
Moro

(10) Patent No.: US 7,403,308 B2
(45) Date of Patent: Jul. 22, 2008

(54) IMAGE FORMING APPARATUS

(75) Inventor: Akihiro Moro, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 995 days.

(21) Appl. No.: 10/374,721

(22) Filed: Feb. 27, 2003

(65) Prior Publication Data

US 2004/0095594 A1  May 20, 2004

Related U.S. Application Data

(63) Continuation-in-part of application No. 10/293,296, filed on Nov. 14, 2002, now Pat. No. 7,307,758.

(51) Int. Cl.
    *G06F 3/12* (2006.01)
    *H04N 1/409* (2006.01)

(52) U.S. Cl. ............... 358/2.1; 358/1.13; 358/426.02; 382/232

(58) Field of Classification Search ........... 358/1.13, 358/2.1, 426.02, 3.24, 3.26, 501; 382/176, 382/232, 233
See application file for complete search history.

(56) References Cited

U.S. PATENT DOCUMENTS

| 5,786,906 | A * | 7/1998 | Shishizuka ............. 358/500 |
| 5,911,004 | A * | 6/1999 | Ohuchi et al. ........... 382/173 |
| 6,023,526 | A * | 2/2000 | Kondo et al. ........... 382/165 |
| 6,204,933 | B1 * | 3/2001 | Yoshino et al. ......... 358/1.9 |
| 6,285,458 | B1 * | 9/2001 | Yada .................. 358/1.15 |
| 6,456,403 | B1 * | 9/2002 | Archer et al. ........... 358/474 |
| 2003/0043410 | A1 * | 3/2003 | Fukawa et al. .......... 358/2.1 |

FOREIGN PATENT DOCUMENTS

| JP | 11-075073 A | 3/1999 |
| JP | 2000-188689 A | 7/2000 |
| JP | 2002-103686 A | 4/2002 |
| JP | 2002-165101 A | 6/2002 |
| JP | 2002-247290 A | 8/2002 |
| JP | 2002-247382 A | 8/2002 |
| JP | 2002247290 A * | 8/2002 |
| JP | 2002247382 A * | 8/2002 |

OTHER PUBLICATIONS

A. Moro, U.S. PTO Office Action, U.S. Appl. No. 10/293,296, Apr. 16, 2007, 14 pages.
A. Moro, U.S. PTO Notice of Allowance and Fee(s) Due, U.S. Appl. No. 10/293,296, Aug. 16, 2007, 13 pages.

* cited by examiner

*Primary Examiner*—Thomas D Lee
(74) *Attorney, Agent, or Firm*—Foley & Lardner LLP

(57) ABSTRACT

An image forming apparatus including an image reading section having a plurality of sensors with their different features, an image processing section which applies a processing to image data according to the sensors with different features acquired at the image reading section, at least one of an operation section which accepts a mode specification and a determination section which determines an original type, and a control section which selects a processing of the image processing section based on the specification of the operation section or the determination of the determination section.

6 Claims, 17 Drawing Sheets

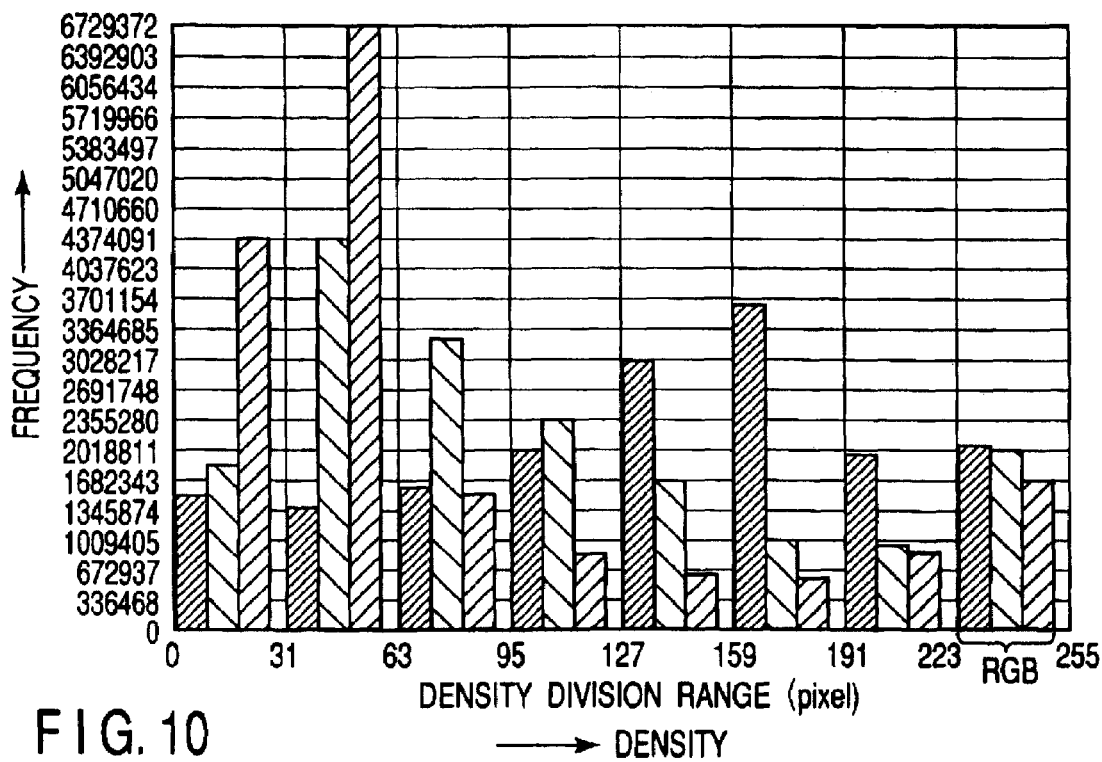
F I G. 10
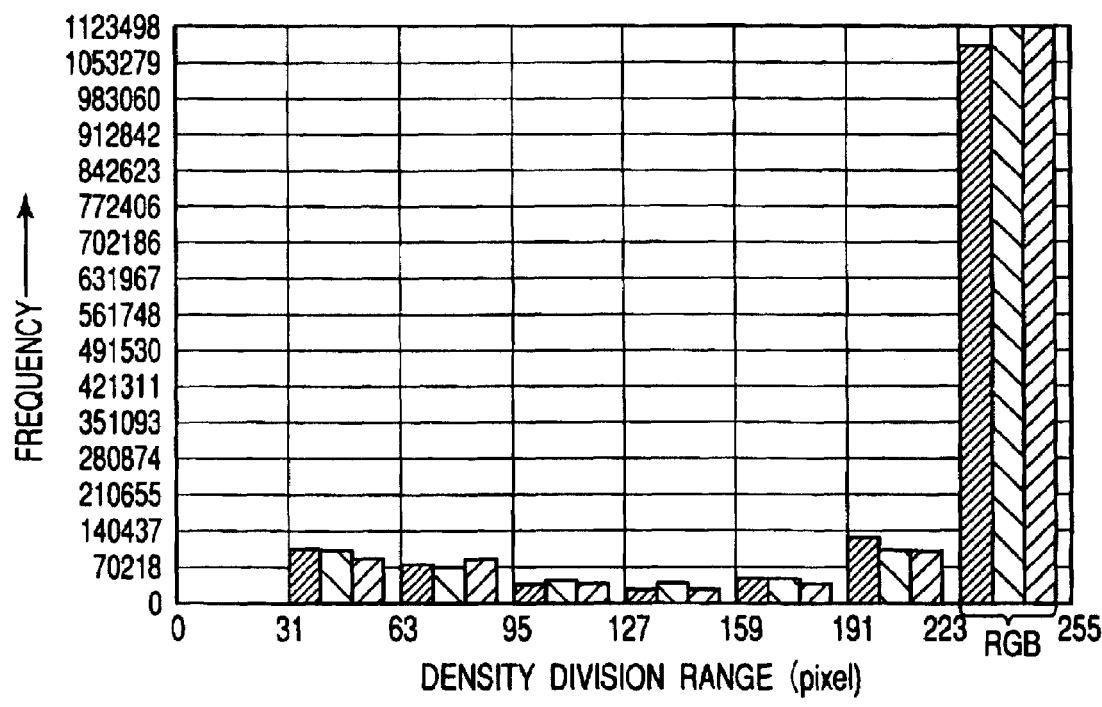
F I G. 11

IMAGE FORMING APPARATUS

CROSS-REFERENCE TO RELATED APPLICATIONS

This is a Continuation-in-Part application of U.S. patent application Ser. No. 10/293,296, filed Nov. 14, 2002 now U.S. Pat. No. 7,307,758, the entire contents of which are incorporated herein by reference.

BACKGROUND OF THE INVENTION

1. Field of the Invention

The present invention relates to an image forming apparatus, an image forming method, and an image processing method of the image forming apparatus which carry out printing by applying an image processing to original image data obtained from a scanner or the like.

2. Description of the Related Art

In these years, some types of color digital copying machines have automatic color select functions (ACS).

Jpn. Pat. Appln. KOKAI Publication No. 2002-165101, for instance, discloses an image forming apparatus having a color determination section that determines whether an original scanned by a color CCD sensor is a black-and-white one or a color one, and a setting section that sets a black-and-white/color mode for image formation on the basis of the determination. In the prior-art techniques including this one, the black-and-white/color determination can be made by the ACS. However, it is not possible to subject a black-and-white character original and a black-and-white photo original to different processes. As regards a photo original, a gray-scale process is important for the image quality. However, a gray-scale process is not important for the image quality in the case of a character original.

In a character original, productivity can be improved by applying velocity priority processing which does not place importance on a gray-scale process.

In addition, with respect to an image data printing operation in which the above processing is applied, in an engine having a mechanism in which full color printing is effected in a four-rotation system, if monochromatic printing is effected by a color printing operation only, a wasteful operation is made, and a printing velocity is slow.

Therefore, there is a need for an image forming apparatus and method and an image processing method of such an apparatus in which restriction of image quality degradation can be made compatible with improvement of productivity by selecting an image processing section from a plurality of image processing sections for following a user instruction or carrying out automatic determination of an original type, thereby carrying out image processing according to the original type.

BRIEF SUMMARY OF THE INVENTION

According to an aspect of the present invention, there is provided an image forming apparatus comprising: an image reading section having a plurality of sensors with their different features; an image processing section which applies a processing to image data according to the sensors with their different features, the image data being acquired by the image reading section; at least one of an operating section which accepts a mode specification and a determination section which determines an original type; and a control section which selects a processing of the image processing section based on the specification of the operating section or the determination of the determination section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a histogram showing density and frequency of a color original;

FIG. 11 is a histogram showing density and frequency of a monochromatic text original;

DETAILED DESCRIPTION OF THE INVENTION

Figure 1:
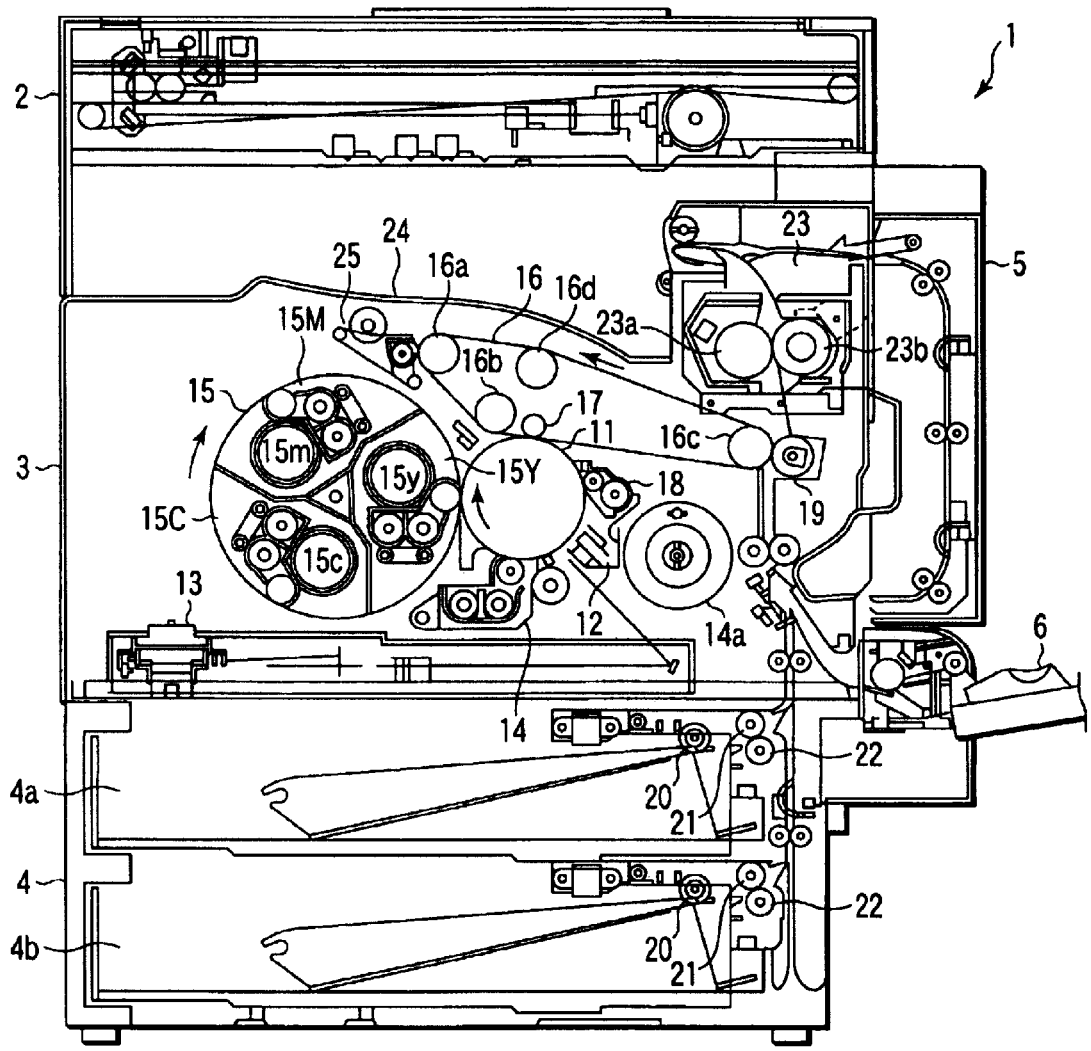
FIG. 1 is a schematic cross section of an image forming apparatus according to an embodiment of the present invention.

An embodiment of the present invention will now be described with reference to the accompanying drawings. In the embodiment, this invention is applied to a color digital copying machine 1.

FIRST EMBODIMENT

A schematic internal structure of a color digital copying machine 1 will be described with reference to accompanying drawings. The color digital copying machine 1 houses a scanner section 2, a printer section 3, and a paper feeding section 4 in a casing. The scanner section 2 irradiates an original set at an original table (not shown), guides reflection light from the original to a light receiving element via a plurality of optical members, carries out photoelectric conversion, and outputs image data. The printer section 3 outputs an image on paper P based on image data read from the original at the scanner section 2, or image data inputted from an external device (not shown). The paper feeding section 4 supplies the paper P to the printer section 3.

In addition, a double-side unit 5 and a manual insertion unit 6 are removably mounted at the right side in the figure of the casing of the color digital copying machine 1. The double-side unit 5 inverts the paper P having an image formed on one side thereof at the printer section 3, and supplies the paper to the printer section 3 again. The manual insertion unit 6 supplies the paper P to the printer section 3 by means of manual insertion.

The printer section 3 has a photosensitive drum 11 having a tube shaft which extends in a front-rear direction (in a paper surface direction) of the color digital copying machine 1. At the periphery of the photosensitive drum 11, a charger device 12, an exposure device 13, a black developer 14, a revolver 15, an intermediate transfer belt 16, and a drum cleaner 18 are provided along a rotation direction indicated by the arrow in the figure, of the photosensitive drum 11.

The charger device 12 charges the outer periphery surface of the photosensitive drum 11 at a predetermined potential. The exposure device 13 exposes the drum surface charged at the predetermined potential, and forms an electrostatic latent image based on image data.

The black developers 14 are disposed in opposite to each other between the photosensitive drum 11 and the exposure device 13. The black developer 14 supplies and develops a black developing agent to an electrostatic black image formed on the drum surface by means of the exposure device 13, develops an image, and forms a black developing image on the drum surface. The black developer 14 has a mixer which supplies the developing agent by stirring it and developing rollers disposed on the drum surface in opposite to each other via a predetermined developing gap. The black developer 14 is movably provided so as to make the developing roller proximal to or distant from the drum surface. Also in the black developer, the developing agent is supplied from a toner cartridge.

The revolver 15 is rotatably provided in adjacent to the left side in the figure of the photosensitive drum 11. The revolver 15 has a yellow developer 15Y, a magenta developer 15M, and a cyan developer 15C each having a structure basically identical to that of the black developer 14. Each of these developers is removably housed in the revolver 15 along the rotation direction of the revolver 15. In addition, these developers have toner cartridges 15y, 15m, and 15c which house the developing agents of the respective colors. Then, the color developers are selectively disposed in opposite to each other on the drum surface from the side of the photosensitive drum 11 by rotating the revolver 15 in counterclockwise direction.

An intermediate transfer belt 16 is disposed at an adjacent position upwardly in a gravity direction with respect to the photosensitive drum 11. The intermediate transfer belt 16 is provided in a tensile manner by being around a drive roller 16a, a transfer front roller 16b, and a transfer opposite roller 16c, and a tension roller 16d, each of which has a rotary shaft extending in the front-rear direction. The drive roller 16a is fixedly provided with respect to the casing upward of the revolver 15; the transfer front roller 16b is fixedly provided with respect to the casing upwardly of the photosensitive drum 11; and the transfer opposite roller 16c is fixedly provided at a position to be rolled in contact with a longitudinal transfer passage described later. The tension roller 16d is biased from the inside to the outside of the belt so as to impart a predetermined tensile force to the intermediate transfer belt.

Moreover, at the inside of the intermediate transfer belt 16, there is provided a primary transfer roller 17 for causing the intermediate transfer belt 16 to be rolled in contact with the drum surface and for transferring to the intermediate transfer belt 16 the developing agent image formed on the drum surface. The primary transfer roller 17 is biased in the direction of the photosensitive drum 11 so as to pressurize the intermediate transfer belt 16 on the drum surface by a predetermined pressure.

At the periphery of the intermediate transfer belt 16, a belt cleaner 25 and a secondary transfer roller 19 are provided such that they can be made proximal to or distant from the belt surface, respectively. The belt cleaner 25 is provided on the outer periphery of the drive roller 16a via the intermediate transfer belt 16 upwardly of the revolver 15. The secondary transfer roller 19 is provided at a position which sandwiches a longitudinal transport passage described later between the roller 19 and the transfer opposite roller 16c via the intermediate transfer belt 16. The drum cleaner 18 is disposed in contact with the photosensitive drum 11 from the right side in the figure.

The paper feeding section 4 has two paper feeding cassettes 4a and 4b to be overlapped at the top and bottom. Pickup rollers 20 which pick up paper P at the upper-most end housed in the cassettes are provided respectively at the right upper end in the figure, of the paper feeding cassettes 4a and 4b. A feed roller 21 and a separation roller 22 are disposed to be connected to each other at the adjacent positions on the downstream side in the paper pickup direction by the pickup roller 20.

In addition, a longitudinal transport passage extending upwardly in a substantially vertical direction through a secondary transfer region in which the above described intermediate transfer belt 16 and secondary transfer roller 19 are rolled in contact with each other is provided at the adjacent position at the right side in the figure, of the paper feeding cassettes 4a and 4b. On the longitudinal transport passage, a fixing section 23 which fixes the developing agent image transferred on paper P by heating and pressurizing the agent is provided. The fixing section 23 has a heating roller 23a which incorporates a heater therein and a pressurization roller 23b disposed to be pressurized against the heating roller 23a.

Now, an image forming operation by the color digital copying machine 1 will be described here.

First, a color printing operation for forming a color image will be described below. In an initial operation, the black developer 14 is moved downwardly and is spaced from the drum surface; the revolver 15 is revolved in a clockwise direction; and a yellow developer 15Y is opposed on the drum surface. Also, the revolver is revolved axially in a counterclockwise direction, and is spaced from the intermediate transfer belt 16. Then, the secondary transfer roller 19 is moved in the right direction in the figure spaced from a longitudinal transport passage, and is spaced from the intermediate transfer belt 16.

Then, image data is read from an original (not shown) via the scanner section 2, or image data is inputted from an external device (not shown). Further, the photosensitive drum 11 is rotated in a clockwise direction, and the drum surface is charged uniformly at a predetermined potential by means of the charger device 12. At this time, the intermediate transfer belt 16 as well is rotated in a counterclockwise direction.

Further, based on image data for color decomposed yellow, the exposure device 13 operates, and a yellow electrostatic latent image is formed on the drum surface. Then, a yellow developing agent is supplied to the electrostatic latent image on the drum surface via the yellow developer; the yellow electrostatic latent image is developed; and a yellow developing agent image is formed on the drum surface. The yellow developing agent thus formed on the drum surface is moved by rotation of the photosensitive drum 11, and a primary transfer region rolled in contact with the intermediate transfer belt 16 is passed.

At this time, a bias of inverted polarity against the potential of the yellow developing agent image is imparted via the primary transfer roller 17, and the yellow developing agent image on the drum surface is transferred onto the intermediate transfer belt 16.

After the yellow developing agent image has been transferred onto the intermediate transfer belt 16, the yellow developing agent remaining on the drum surface without being transferred is removed by the drum cleaner 18. At this time, the residual charge on the drum surface as well is removed at the same time.

Then, for the preparation for forming a next magenta electrostatic latent image on the drum surface, the drum surface is charged uniformly by means of the charger device 12; the revolver 15 is revolved; and the magenta developer 15M is opposed to the drum surface.

In this state, a series of processes described above, i.e., exposure, developing, and transfer to the intermediate transfer belt are effected in order, and the magenta developing agent is transferred to be overlapped with the yellow developing agent image on the intermediate transfer belt 16. After the magenta developing agent image has been thus transferred, the cyan developing agent is transferred to be overlapped in the same manner.

Then, in any of the developers, the revolver 15 is revolved at a home position which is not opposite to the drum surface. Instead, the black developer 14 is risen, and is opposed to the drum surface. In this state, processes similar to the above described processes are executed, and the black developing agent image is transferred onto the intermediate transfer belt 16 to be overlapped with the yellow developing agent image, magenta developing agent image, and cyan developing agent image.

When the developing agent images of all colors have been thus overlapped on the intermediate transfer belt 16, the secondary transfer roller 19 is moved in the left direction in the figure, and is rolled in contact with the intermediate transfer belt 16. Then, the belt cleaner 25 as well is brought into contact with the intermediate transfer belt 16. In this state, the developing agent images of all the colors overlapped on the intermediate transfer belt 16 are moved by rotation of the intermediate transfer belt 16, and the secondary transfer region between the belt and the secondary transfer roller 19 is passed.

At this time, the paper P picked up from the paper feeding cassette 4a, for example, by the pickup roller 20, is transported upwardly of the longitudinal transport passage, and is fed to the secondary transfer region.

Then, a bias of inverted polarity against the potential of the developing agent image of each color is applied via the secondary transfer roller 19, and the developing agent image of each color on the is intermediate transfer belt 16 is transferred onto the paper P. After the developing agent image has been transferred onto the paper P, the developing agent which remains on the intermediate transfer belt 16 is removed by means of the belt cleaner 25.

The paper P on which the developing agent images of all the colors color has been collectively transferred is then heated and pressurized after the fixing section 23 has been passed; the developing agent image of each color is fixed onto the paper P, and a color image is formed. The paper P on which a color image has been thus formed is ejected onto a paper ejection tray 24 provided at the downstream side of the fixing section 23.

In a color printing operation for forming a color image in this manner, the photosensitive drum 11 makes three rotations in order to form a developing agent image by supplying the developing agents of the yellow, cyan, and magenta colors housed in the revolver 15. Further, when a developing agent image is formed by a black developing agent, the photosensitive drum 11 makes one rotation. That is, the foregoing color printing operation is an operation which forms an image by repeating an operation for supplying a developing agent four times (a plurality of times).

In the case of a color digital copying machine for forming a color image by three colors, cyan, magenta, and yellow, an operation for supplying a developing agent is carried out three times (a plurality of times). The thus constructed copying machine is effective if an attempt is made to increase a printing velocity because the number of operations is reduced.

Now, a monochromatic operation for forming a monochromatic image will be described here. In an initial operation, in any of the yellow developer 15Y, magenta developer 15M, and cyan developer 15C, the revolver 15 is positioned at a home position which is not opposed to the surface of the photosensitive drum 11. In addition, the black developer 14 is disposed so as to be opposed to the surface of the photosensitive drum 11.

Then, an operation for forming a black image described with respect to a color printing operation is carried out, and a black developing agent image is formed on the paper P.

In this manner, in a monochromatic operation, a photosensitive drum makes one rotation in order to form a developing agent image by supplying a black developing agent. That is, the foregoing monochromatic operation is an operation which forms an image by making one operation for supplying a developing image agent.

Figure 2:
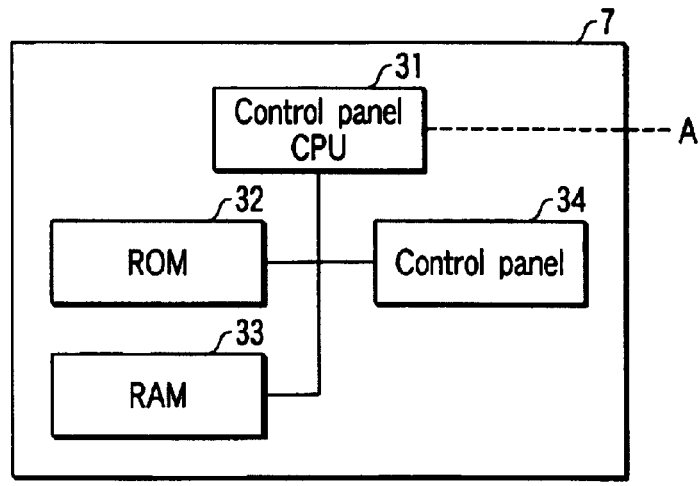
FIG. 2 is a control block diagram depicting a control panel section.
Figure 3:
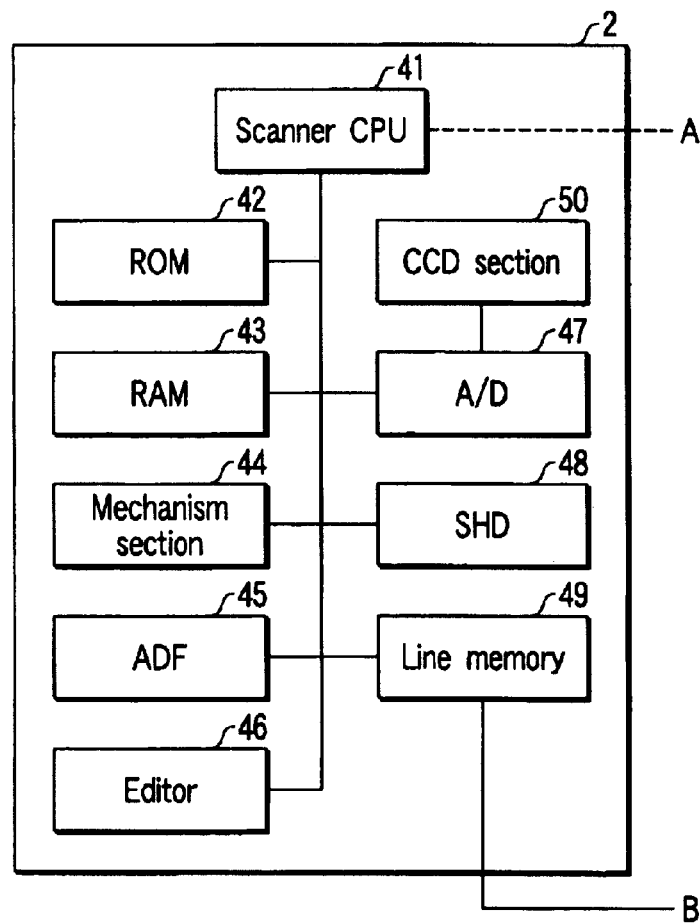
FIG. 3 is a control block diagram depicting a scanner section.
Figure 4:
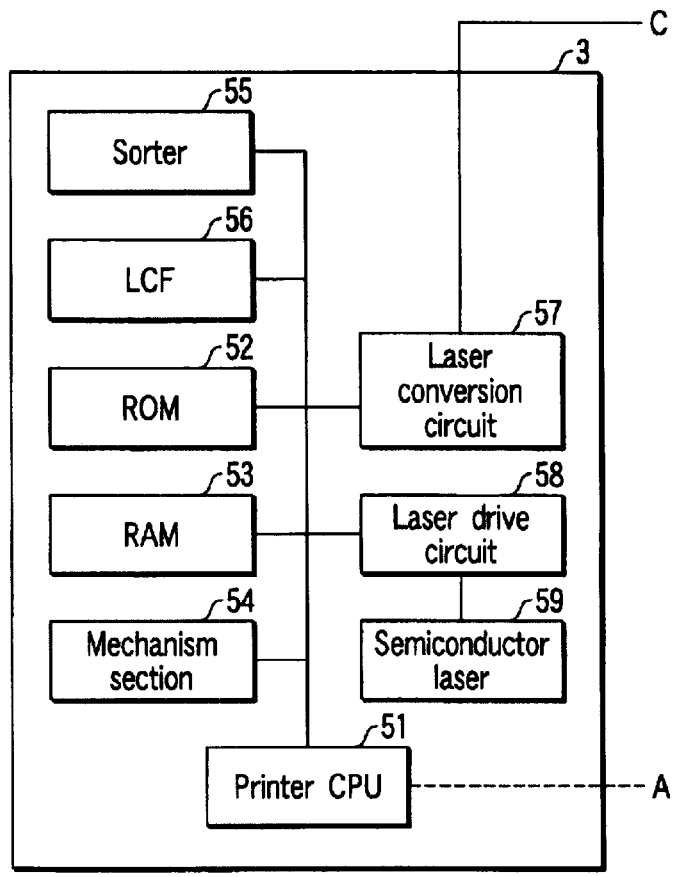
FIG. 4 is a control block diagram depicting a printer section.
Figure 5:
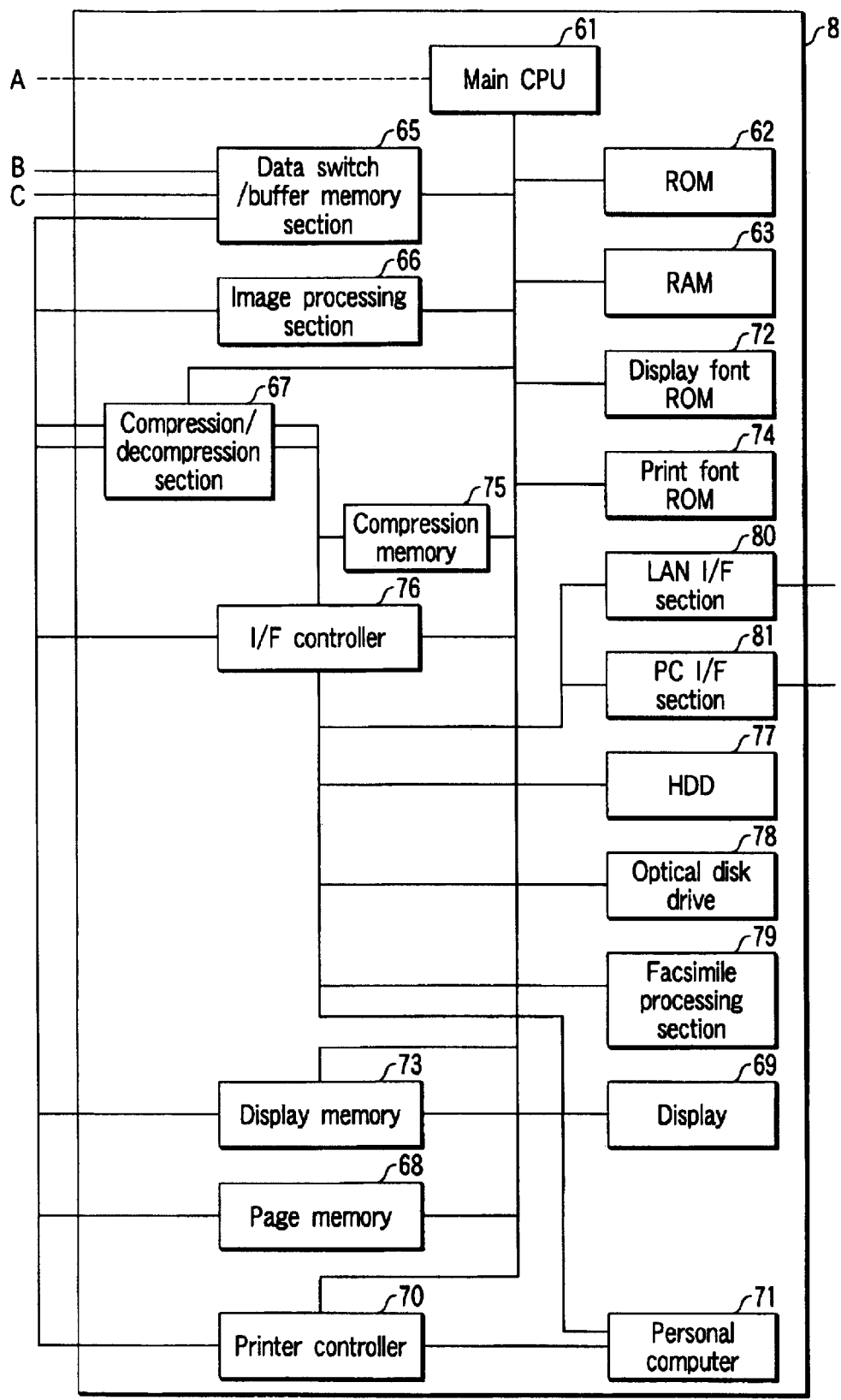
FIG. 5 is a control block diagram depicting a basic processing section.

A control configuration of the color digital copying machine 1 will be described with reference to FIG. 2 to FIG. 5. FIG. 2 is a diagram showing a control configuration of a control panel section 7; FIG. 3 is a diagram showing a control configuration of the scanner section 2; FIG. 4 is a diagram showing a control configuration of the printer section 3; and FIG. 5 is a diagram showing a control configuration of a basic processing section 8, respectively.

As shown in FIG. 2 to FIG. 5, a main CPU (control section) 61, a control panel CPU 31, a scanner CPU 41, and a printer CPU 51 control the basic processing section 8, the control panel section 7, the scanner section 2, and the printer section 3, respectively.

The main CPU 61 communicates with the control panel CPU 31, scanner CPU 41 and printer CPU 51 and controls the same.

The control panel CPU 31 is connected to a ROM 32 and a RAM 33. Based on data stored in the ROM 32 and RAM 33, the control panel CPU 31, for example, detects operations of switches on the control panel 34, turns on/off LEDs on the control panel 34, and controls a display and a touch panel on the control panel 34.

A user sets a mode when a control panel 34 is operated, thereby making a copy. Mode settings include an image mode setting and an original mode setting, for example. In an image mode, "full color", "black", and "automatic original determination" are provided. A full color mode is provided as a mode for making a copy in full color irrespective of original type. A black mode is provided as a mode for making a copy in white and black irrespective of original type. An automatic original determination mode is provided as a mode for automatically determining an original color, a monochrome text, or monochromatic photograph, and then, carrying out full color printing for a color original, monochromatic printing for a monochromatic text, and monochromatic multiple-value printing for a monochromatic photograph. In addition, "automatic color determination" may be provided instead of "automatic original determination". An automatic color determination mode is provided as a mode for carrying out printing in color printing operation if a color original is set and for carrying out printing in a monochromatic operation if a monochromatic original is set. Then, the user sets an image mode, and sets an original mode. In an original mode, modes such as "text/photo", "text", and "printed photo" can be set as original type. The text/photo mode is provided as a mode for setting an original on which a text and a printed photograph coexist. The text mode is provided as a mode for setting an original including only text (or characters and lines). The printed photo mode is provided as a mode for setting processing suitable to a printed photo-graph original to be carried out. Automatic original determination is not limited to determination of type of the original. For example, an original type may further be determined from a photo, a map, or a color photo printed on photosensitive paper. In determination of an original type, even if determination is not made on page by page basis, a configuration in which determination is made on a predetermined block by block basis may be provided. In addition, the user can set a magnification such as original size expansion or reduction when the user operates the control panel 34, thereby making a copy.

Based on data stored in a ROM 42 and RAM 43, the scanner CPU 41 controls a mechanism section 44 including a motor, a solenoid, etc. (not shown), and also controls an automatic document feeder (ADF) 45, a coordinate input device (editor) 46, an analog/digital converter circuit (A/D) 47, a shading correction circuit (SHD) 48 and a line memory 49.

A CCD section 50 is connected to the A/D converter 47.

Figure 7:
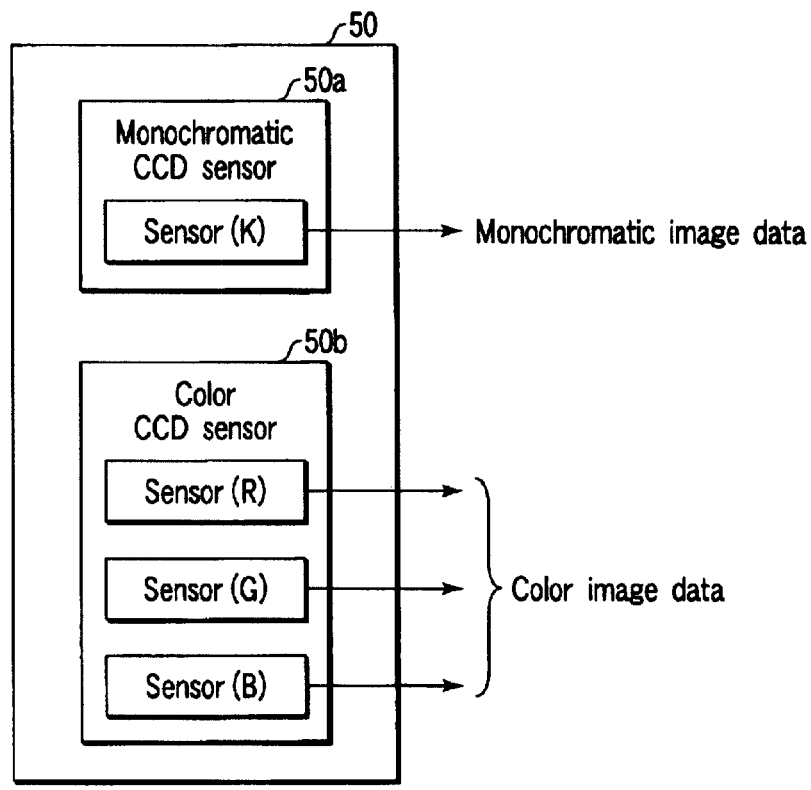
FIG. 7 is a diagram showing a schematic configuration of a monochromatic CCD sensor and a color CCD sensor.
Figure 8:
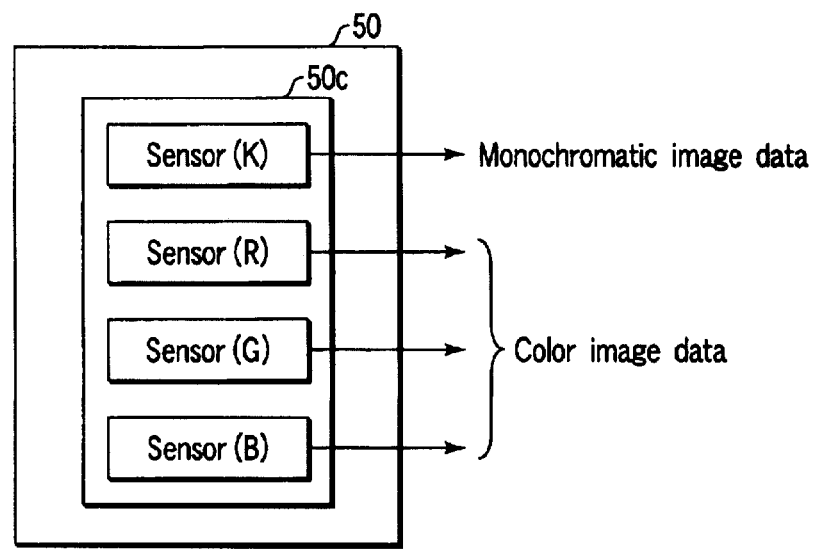
FIG. 8 is a diagram showing a schematic configuration of a four-line sensor.
Figure 9:
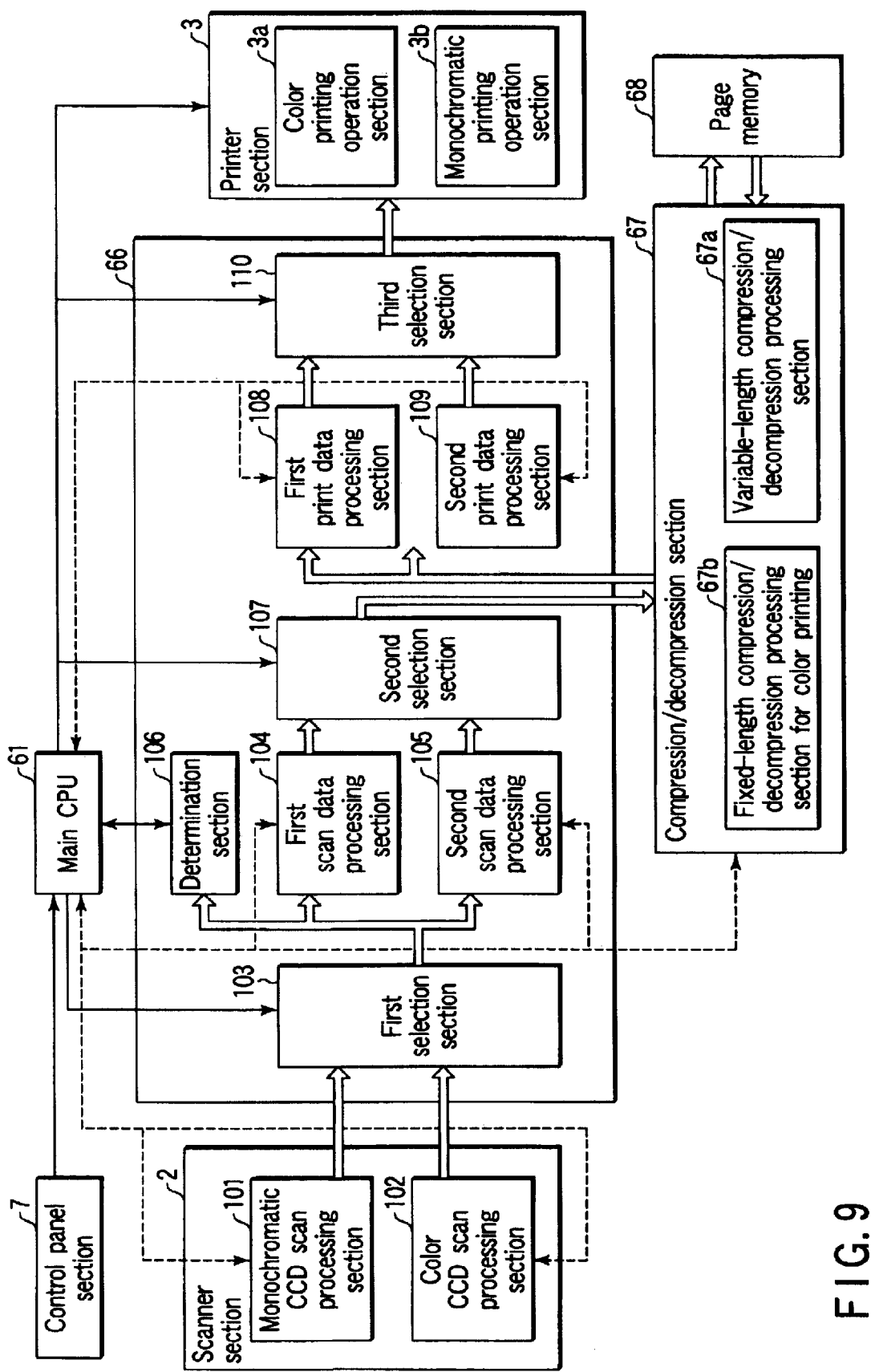
FIG. 9 is a diagram showing a configuration of an image processing according to a first embodiment of the present invention.

In this embodiment, the CCD section 50 is designed to read an image by two devices such as a monochromatic CCD sensor 50*a* and a color CCD sensor 50*b*, as shown in FIG. 7. However, as shown in FIG. 8, a configuration may be provided such that an image is read by one device 50*c* using four line sensors for black (K), red (R), green (G), and blue (B) colors. As the sensors thus provided at the scanner section 2, there are disposed sensors with their differential features. In the features of these sensors, the resolutions of image reading or image reading velocities may be different as well as different colors. As shown in FIG. 9, the image read by the monochromatic CCD sensor 50*a* is processed at a monochromatic CCD scan processing section 101, and the image read by the color CCD sensor 50*b* is processed at a color CCD scan processing section 102. The image processing of each processing section which is applied to original image data read by these processing sections include conversion processing from an analog signal into a digital signal, shading correction processing, and gamma correction processing. As the monochromatic CCD sensor 50*a* which reads an original as a monochromatic image, there may be used a sensor with its excellent reading velocity and resolution as compared with the color CCD sensor 50*b* which reads an original as a color image.

On the basis of data stored in a ROM 52 and a RAM 53, the printer CPU 51 controls a mechanism section 54 including a motor, a solenoid, etc. (not shown), and also controls a sorter 55, a large cassette feeder (LCF) 56, a laser conversion circuit 57, and a laser drive circuit 58 that controls a semiconductor laser 59.

The printer CPU 51 achieves the color printing operation and monochromatic operation described previously under the control of the main CPU 61 by controlling each section in this manner.

The main CPU 61 controls the entirety of the color digital copying machine 1 according to control programs stored in a ROM 62 and a RAM 63. The ROM 62 stores various parameters to be used at the time of image processing.

Figure 6:
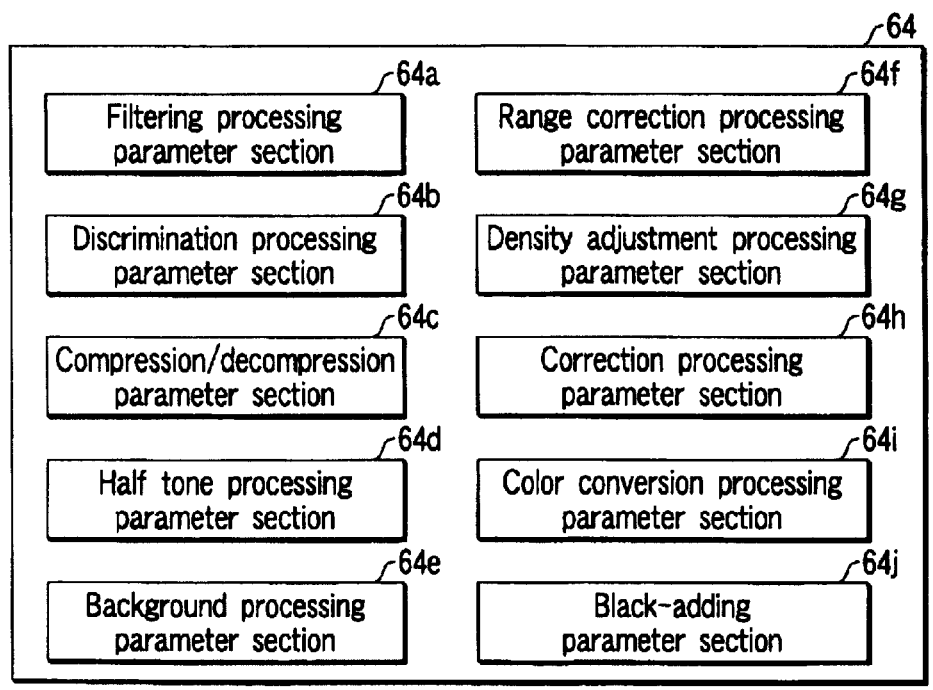
FIG. 6 is a diagram conceptually showing a parameter section which stores a parameter for use in an image processing.

As shown in FIG. 6, a parameter section 64 which stores a parameter for use in a variety of image processes is provided at part of a storage region of the ROM 62. At the parameter section 64, there are provided: a filtering processing parameter section 64*a*; an discrimination processing parameter 64*b*; a compression/decompression processing parameter section 65*c*; a half tone processing parameter section 64*d*; a background processing parameter section 64*e*; a range correction processing parameter section 64*f*; a density adjustment processing parameter section 64*g*; a gamma correction processing parameter section 64*h*; a color conversion processing parameter section 64*i*; and a black-adding parameter section 64*j*. At the each parameter section 64, parameters are provided according to types of the image mode and original mode described above. Also, based on the set image mode and original mode, when the main CPU 61 carries out each image processing, the parameters are set at an image processing section for selecting the parameters and carrying out processing. In setting of the parameters based on such a configuration, there is no need to provide all the parameters indicated at each of the parameter sections described above. A single parameter setting may be provided, or a plurality of settings of arbitrarily combined parameters may be provided.

Moreover, at the above filtering processing parameter section 64*a*, when copying is further made, when expansion or reduction of an original is set in size, parameters for setting a filter coefficient and a filter strength according to its magnification are stored in plurality. In the settings of filter coefficients and filter strength according to the magnification, a magnification in a predetermined range may be set from a table, i.e., by selecting a set value. In addition, a plurality of values is stored to be associated with predetermined magnifications, and linear interpolation is provided according to a specified magnification, whereby a calculation result thereof may be set.

A data switch/buffer memory section 65 effects switching as to where data scanned by the scanner section 2 is to be sent, and which data is to be sent to the printer section 3. Details of the structure and operation of an imaging processing section 66 will be described later. A compression/decompression section 67 compresses/decompresses image data. A page memory 46 stores image data in units of a page. A display memory 69 stores image data to be displayed on a display. A printer controller 70 develops code data from a personal computer 71 into image data. A display font ROM 72 develops code data onto the display memory 73. A print font ROM 74 develops code data onto the page memory 68. A compression memory 75 stores data compressed by the compression/decompression section 67.

The main CPU 61 is further connected via an I/F controller 76 to a hard disk drive (HDD) 77, an optical disk drive 78, a facsimile processing section 79, a local area network (LAN) interface (I/F) section 80, and a PC interface (I/F) section 81.

The HDD 77 stores various programs, such as OCR automatic recognition software, for performing character recognition on the basis of the data stored in the page memory 79. The facsimile processing section 57 forwards processed image data to an external communication line (not shown) connected to the present copying machine, or receives image data from the external communication line.

The LAN I/F section 80 is used to make communication with a computer device (not shown) which is connected to the LAN. The PC I/F section 81 is provided as a serial interface, for example, and is used to make communication with a computer device (not shown).

In the color digital copying machine 1 with the above structure, image data scanned by the scanner section 2 is subjected to image processing in the image processing section 66. Based on the processed image data, the printer section 3 performs image formation.

The image processing section 66 will now be described with reference to the control block diagram of FIG. 9. In FIG. 9, double-line arrows indicate flows of image data scanned by the scanner section 2, which is to be output to the printer section 3 via the image processing section.

Image data scanned by the monochromatic CCD sensor 50a and subjected to correction processing in the monochromatic CCD scan processing section 101, or image data scanned by the color CCD sensor 50b and subjected to correction processing in the color CCD scan processing section 102, is input to a first selection section 103. At the time of scan, the image data selected by the first selection section 103 is delivered to either a first scan data processing section 104 or a second scan data processing section 105. At the time of pre-scan, the image data selected by the first selection section 103 is delivered to a determination section 106. How the first selection section 103 selects output image data at the time of scan will be described later.

The first scan data processing section 104 subjects the monochromatic image data input from the monochromatic CCD scan processing section 101 to filtering processing, to density adjustment processing, to range correcting processing, and to half tone processing using an error diffusion process that is a pseudo-half tone process. In other words, the first scan data processing section 104 performs processes that place priority on a processing speed (V1). For this purpose, the processing section 104 decreases the amount of image data to a lower bit (M bit) than in the second scan data processing section 105 in front of the compression/decompression section 67. These processes achieve handling for shortening an access time to the page memory 68 to realize electronic sorting, and achieve effective use of OCR automatic recognition software.

When filtering processing, density adjustment processing, or a half tone process is carried out, one or more parameters used when each processing is carried out are set by the main CPU 61 based on a mode for making a copy of an original after selected from a plurality of parameters stored in the filtering processing parameter section 64a, the density adjustment processing parameter section 64g, the range correction processing parameter section 64f, and the half tone processing parameter section 64d.

The second scan data processing section 105 subjects RGB color image data input from the color CCD scan processing section 102 to color conversion processing, to background processing, to recognition processing, to filtering processing and to density adjustment processing. The processing section 105 also subjects monochromatic image data input from the monochromatic CCD scan processing section 101 to color conversion processing, to filtering processing and to density adjustment processing. In other words, the second scan data processing section 105 performs processes that place priority on image quality, and not on a processing speed (V2, V1>V2). Specifically, the processing section 105 prioritizes gray-scale reproducibility as in the case of color images and monochromatic photo images, and makes the amount of image data greater than in the first scan data processing section 104 (N bit, N>M) in front of the compression/decompression section 67.

When color conversion processing, filtering processing, or density adjustment processing is carried out for any item of data, one or more parameters used when each processing is carried out are set by the main CPU 61 based on a mode for making a copy of an original after selected from a plurality of parameters stored in the color conversion processing parameter section 64i, the filtering processing parameter section 64a, the density adjustment processing parameter 64g, the background processing parameter section 64e, and the discrimination processing parameter section 64b in the ROM 62.

Image data processed by the first scan data processing section 104 and second scan data processing section 105 is output to a second selection section 107. How the second selection section 107 selects output image data will be described later. Image data from the second selection section 107 is output to the compression/decompression section 67.

When monochromatic-text image data has been input to the compression/decompression section 67, a variable-length compression/decompression processing section 67a is selected to process the image data. When color image data and monochromatic-photo image data has been input to the compression/decompression section 67, a fixed-length compression/decompression processing section 67b for color data and the variable-length compression/decompression processing section 67a are both selected to process the image data. For example, color image data is compressed by the fixed-length compression/decompression processing section 67b and then further compressed by the variable-length compression/decompression processing section 67a; The selection of each processing sect-ion 67a, 67b is made by the control of the main CPU 61 in accordance with the kind of each page of originals.

In addition, one or more parameters used for processing of a compression/decompression section 67 are set by the main CPU 61 based on a mode for making a copy of an original after selected from the compression/decompression processing parameter section 64c stored in the ROM 62.

Data compressed by the compression/decompression section 67 is temporarily stored in the page memory 68. Then, the data is decompressed by the compression/decompression section 67. The decompressed data is input to a first print data processing section 108 and a second print data processing section 109.

The first print data processing section 108 performs a half tone process that places priority on a processing speed and is suitable for low-bit (M-bit) image data from the first scan processing section 104. The first print data processing section 108 subjects the input image data to a smoothing process and a monochromatic process and outputs the resultant image data to the printer section 3.

One or more parameters used when a half tone process is carried out are set by the main CPU 61 based on a mode for making a copy of an original after selected from a plurality of parameters stored in the half tone processing parameter section 64d in the ROM 62.

The second print data processing section 109 performs a half tone process that places priority on an image quality and is suitable for greater-number bit (N-bit, N>M) data than in the first print data processing section 108. The second print data processing section 109 subjects the input image data to a black-adding process and a half tone process and to a color multi-value process and outputs the resultant image data to the printer section 3.

One or more parameters used when black-adding processing or each half tone process is carried out are set by the main CPU 61 based on a mode for making a copy of an original after selected from a plurality of parameters stored in the black-adding processing parameter section 64j and the half tone processing parameter section 64d in the ROM 62.

The image data processed by the first print data processing section 108 and second print data processing section 109 is output to a third selection section 110. How the third selection section 110 selects output image data will be described later. The image data from the third selection section 110 is output to the printer section 3.

At the printer section 3, the color printing operation described previously is achieved by a color printing operation section 3a, and a monochromatic operation is achieved by a monochromatic operation section 3b, thereby forming an image. Which of these operations is used to form an image is selected in accordance with an instruction from the main CPU 61 based on a mode for making a copy of an original.

In addition, at a determination section 106, in the case of an automatic original determination mode, pixels of image data read from an original are provided as a histogram in density distribution and frequency. Based on such a histogram, the determination section determines whether the original is a color original, a monochromatic text original, or a monochromatic photo original. In the case of an automatic color determination mode, the determination section 106 determines that, if a difference is greater than a predetermined value after the difference in color saturation between R and G, between G and B, and between B and R, of the RGB image data read from the original, has been calculated on a pixel by pixel basis, the original is a color document. If the difference is smaller than the predetermined value, the determination section determines that the original is a monochromatic original.

Determination of type of an original made by the determination section 106 based on a histogram will be described below.

The determination section 106 calculates histogram information of an original on the basis of image data pre-scanned by the color CCD scan processing section 102. For example, input image data (0 to 255) is divided by a predetermined number, e.g. 8, and the frequency of RGB data in each divided data area is calculated. The determination section 106 determines the kind of original base on the frequency in each divided data. The determination of the kind of original is determined on the basis of the frequency variance of RGB data and the frequency ratio among the respective divided data areas. For example, the determination is effected as follows.

Figure 12:
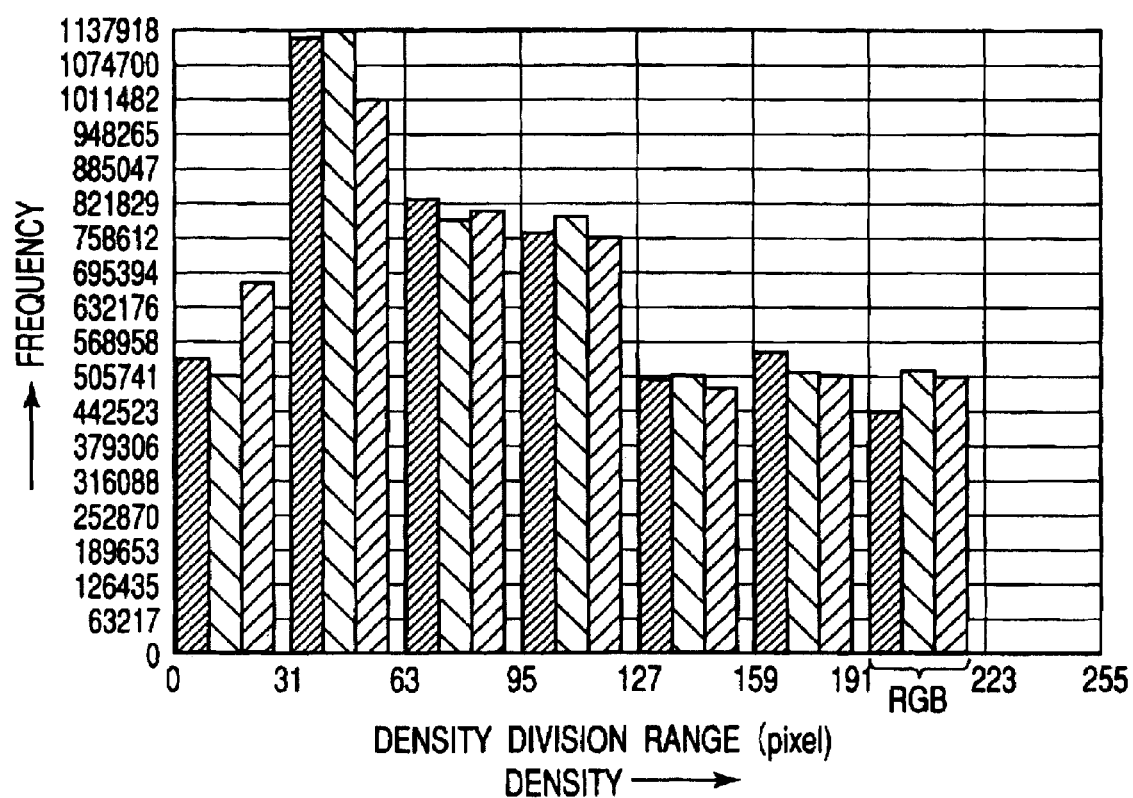
FIG. 12 is a histogram showing density and frequency of a monochromatic photo original.

FIG. 10 illustrates a determination result of a color original, which is determined by the determination section 106. In FIG. 10, the variance in frequency of RGB data in each divided data area is greater than a predetermined threshold A. FIG. 11 illustrates a determination result of a monochromatic text original, which is determined by the determination section 106. In FIG. 11, the variance in frequency of RGB data in each divided data area is not greater than the threshold A. In addition, the frequency in a high-density side divided data area (8th divided data area) is greater than a threshold B and the frequency in the other divided data areas is not greater than the threshold. FIG. 12 illustrates a determination result of a monochromatic photo original, which is determined by the determination section 106. In FIG. 12, the variance in frequency of RGB data in each divided data area is not greater than threshold A, and there are a plurality of divided data areas, which have a frequency greater than a threshold C.

Based on the determination result of each page of originals, which is determined by the determination section 106, the main CPU 61 controls the first selection section 103, second selection section 107 and third selection section 110 and makes selection of output image data from each selection section.

When the original is a color original, the main CPU 61 sets a first image-quality preference mode as an image data processing mode, which places priority on color reproduction. In the first image-quality preference mode, the selection sections are operated to make effective the output results from the color CCD scan processing section 102, second scan data processing section 105 and second print data processing section 109.

At this time, the main CPU 61 controls the color printing operation section 3a of the printer section 3 to carry out multiple-value full color printing by color printing operation.

When the original is a monochromatic photo original, the main CPU 61 sets a second image-quality preference mode as an image data processing mode, which places priority on monochromatic-photo reproduction. In the second image-quality preference mode, the selection sections are operated to make effective the output results from the monochromatic CCD scan processing section 101, second scan data processing section 105 and second print data processing section 109.

At this time, the main CPU 61 controls the monochromatic printing operation section 3b of the printer section 3 to carry out multiple-value printing for monochromatic operation.

In the second image-quality preference mode, the output from the monochromatic CCD sensor 50a is used. Thus, the scan of the original may be performed in accordance with the scan speed of the monochromatic CCD sensor 50a. Thereby, the scan time can be made shorter than in the first image-quality preference mode using the output of the color CCD sensor 50b. In addition, in this case, since the image data obtained from the monochromatic CCD scan section 101 is used, it is possible to prevent disadvantages in resolution, such as thinning in characters and lines, which may occur when using the image data obtained by the color CCD scan processing section 102.

When the original is a monochromatic text original, the main CPU 61 sets a speed preference mode as an image data processing mode, which places priority on a processing speed with the amount of data reduced. In the speed preference mode, the selection sections are operated to make effective the output results from the monochromatic CCD scan processing section 101, first scan data processing section 104 and first print data processing section 108.

At this time, the main CPU 61 controls the monochromatic printing operation section 3b of the printer section 3 to carry out monochromatic printing for monochromatic operation.

In this case, like the second image-quality preference mode, the output from the monochromatic CCD sensor 50a is used. Thus, a high-speed scan operation can be achieved.

Now, an example of control when the color digital copying machine 1 makes a copy will be described with reference to a flow chart of FIG. 13.

First, in step ST101, the main CPU 61 accepts selection of an image mode or an automatic original determination mode. At this time, in the case where the CPU accepts the automatic original determination mode, it determines the original type described above. Then, in step ST102, the main CPU 61 accepts selection of the original mode. In the step ST103, the main CPU 61 determines an image mode for making a copy based on the setting or determination provided in steps ST101 and ST102. If the original is a color original, processing goes to the step ST104. If the original is a monochromatic photo original, processing goes to the step ST 111. If the original is a monochromatic text original, processing goes to the step ST118.

In the step ST104, the main CPU 61 selects the first image-quality preference mode described above. In the step ST105, the main CPU 61 controls the first selection section 103 to set selection of the color CCD scan processing section 102. Then, the main CPU 61 selects a parameter for image processing carried out by the color CCD scan processing section 102 from the parameter section 64, and sets the parameter.

In the step ST106, the main CPU 61 controls a second selection section 107 to set selection of a second scan data processing section 105. Then, the main CPU 61 selects a parameter for each image processing carried out by the second scan data processing section 105 from the parameter section 64 in the ROM 62, and sets the parameter.

In the step ST107, the main CPU 61 subjects image data to fixed-length compression/decompression processing, and then, provide setting so as to carry out variable-length compression/decompression processing at the compression/decompression section 67. The main CPU 61 selects a parameter for use in the compression/decompression section 67 from the parameter section 64, and sets the parameter.

In the step ST108, the main CPU 61 controls a third selection section 110 to set selection of a second print data processing section 109. Then, the main CPU 61 selects a parameter for use in the second print data processing section 109 from the parameter section 64, and sets the parameter.

In the step ST109, the main CPU 61 controls the scanner section 2 to read an image of an original. Then, the acquired image data is processed at each processing section at which the above described parameter has been set, and the processed image data is outputted to the printer section 3.

In the step ST110, the main CPU 61 controls the color printing operation section 3a of the printer section 3 based on the image data processed in each step described above, and causes the operating section to make color printing operation and make multiple-value full color printing. Then, the main CPU terminals processing.

In the step ST111, the main CPU 61 selects the second image-quality preference mode described above. In the step ST112, the main CPU 61 controls the first selection section 103 to set selection of the monochromatic CCD scan processing section 101. Then, the main CPU 61 selects a parameter for use in the monochromatic CCD scan processing section 101 from the parameter section 64, and sets the parameter.

In the step ST113, the main CPU 61 controls the second selection section 107 to set selection of the second scan data processing section 105. Then, the main CPU 61 selects a parameter for use in the second scan data processing section 105 from the parameter section 64, and sets the parameter.

In the step ST114, the main CPU 61 subjects image data to fixed-length compression/decompression processing, and then, sets processing to be carried out by variable-length compression/decompression processing at the compression/decompression section 67. The main CPU 61 selects a parameter for use in the compression/decompression section 67 from the parameter section 64, and sets the parameter.

In the step ST115, the main CPU 61 controls the third selection section 110 to set selection of the second print data processing section 109. Then, the main CPU sets a parameter for use in the second print data processing section 109 from the parameter section 64, and sets the parameter.

In the step ST116, the main CPU 61 controls the scanner section 2 to read an image of an original. Then, the acquired image data is processed at each processing section at which the above described parameter has been set, and the processed image data is outputted to the printer section 3.

In the step ST117, the main CPU 61 controls a monochromatic printing operation section 3b of the printer section 3 based on the image data processed in each step described above, and causes the above printing operation section to make monochromatic printing operation and make multiple-value monochromatic printing. Then, the main CPU terminates processing.

In the step ST118, the main CPU 61 selects the speed preference mode described above. In the step ST119, the main CPU 61 controls the first selection section 103 to set selection of the monochromatic CCD scan processing section 101. Then, the main CPU 61 selects a parameter for image processing carried out at the monochromatic CCD scan processing section 101 from the parameter section 64, and sets the parameter.

In the step ST120, the main CPU controls the second selection section 107 to set selection of the first scan data processing section 104. Then, the main CPU 61 selects a parameter for each image processing carried out at the first scan data processing section 104 from the parameter section 64, and sets the parameter.

In the step ST121, the main CPU 61 causes the compression/decompression section 67 to set image data to be subjected to variable-length compression/decompression processing. Then, the main CPU 61 select a parameter for use in the compression/decompression section 67 from the parameter section 64, and sets the parameter.

In the step ST122, the main CPU 61 controls the third selection section 110 to make a selection of the first print data processing section 108. Then, the main CPU 61 selects a parameter for use in the first print data processing section 108 from the parameter section 64, and sets the parameter.

In the step ST123, the main CPU 61 controls the scanner section 2 to read an image of an original. Then, the acquired image data is processed at each processing section at which the above described parameter has been set, and the processed image data is outputted to the printer section 3.

In the step ST124, the main CPU 61 controls the monochromatic printing operation section 3b of the printer section 3 based on the image data processed in each step described above, and causes the above printing operation section to make monochromatic operation and make monochromatic printing. Then, the main CPU terminates processing.

An example of this control has been described by way of example when one copy is made. In the case where an original is continuously read by an ADF 45, thereby making copies, the above described processing may be repeated according to the number of originals.

Now, an operation of the color digital copying machine 1 will be described by way of example when one makes a copy of a monochromatic photo original.

A user places a monochromatic photo original on an original table (not shown), operates the control panel 34, selects an automatic original determination mode, selects an original mode as text/photo, and inputs a start key.

An original targeted to be copied is determined to be a monochromatic photo original from a determination result of the determination section 106 based on the image data read by a pre-scan operation.

Since the monochromatic photo original has been determined, the second image-quality preference mode is set. Specifically, the first selection section 103 selects the output result from the monochromatic CCD scan processing section 101, the second selection section 107 selects the output result of the second scan data processing section 105, and the third selection section 110 selects the output result of the second print data processing section 109.

At this time, based on mode selection, the main CPU 61 selects a parameter suitable to each selected processing section from the parameter section 64, and sets the parameter.

That is, the image data from the monochromatic CCD scan processing section-101 is subjected to color conversion processing, filtering processing, and density adjustment or the like at the second scan data processing section 105. Then, at the compression/decompression section 67, both of the variable-length compression/decompression section and fixed-length compression/decompression section are selected, and the above processed image data is subjected to compression/decompression processing, and the obtained data is stored in a page memory 68. The image data decompressed at the compression/decompression section 67 from the page memory 68 is subjected to monochromatic multiple-value processing such as black-adding processing or half tone process at the second print data processing section 109, and the processed image data is outputted to the printer section 3.

The monochromatic printing operation section 3b of the printer section 3 makes multiple-value monochromatic printing for monochromatic operation based on the inputted image data, whereby a copy of a monochromatic photo original is made. Therefore, the color digital copying machine 1 can achieve a copy of a monochromatic image with a high image quality without sacrificing resolution such as thin character or thin line display.

The color digital copying machine 1 according to the present embodiment reads an original by pre-scanning, and determines an original type every page from among color, monochromatic photo, and monochromatic text. The copying machine 1 can process image data by selecting a processing section from a plurality of image processing sections provided in advance at the image processing section 66 according to any one of the first image-quality preference mode, second image-quality preference mode, and speed preference mode based on the user specification from the control panel section 7 or based on the determination result. In addition, when this processing is carried out, a proper parameter can be set in each process, and thus, the quality of image formed at the printer section 3 can be improved. Also, image data is subjected to compression/decompression processing, and thus, an amount of data on the page memory 68 can be reduced. Therefore, the copying machine 1 can improve productivity while suppressing image degradation.

In the present embodiment, a description has been given with respect to a case in which image data on an original read by the scanner section 2 is subjected to image processing, and then, printing is carried out at the printer section 3 based on the image data. However, the image data inputted to the image processing section 66 may be outputted to a computer device or the like connected to the LAN I/F section 80 or PC I/F section 81 and the like. This setting is provided by the user on the control panel 34. The image data to be outputted at this time may be image data before processed at an image processing section 66, the image data being read by the scanner section 2, or the image data after processed at each processing section may be outputted.

Furthermore, in the case where the user sets original size expansion or reduction on the control panel 34, the filter coefficient of filtering processing of the first scan data processing section 104 and the second scan data processing section 105 or the coefficient of a filter strength is set according to its magnification. Thus, when an image is formed at the printer section 3, image processing can be carried out without generation of blurring.

SECOND EMBODIMENT

Now, a description will be given with respect to a second embodiment of the present invention. In this second embodiment, a configuration for carrying out automatic color determination is provided instead of original type determination of the first embodiment.

In the step ST201, the main CPU 61 accepts selection of an image mode or an automatic color determination mode. At this time, in the case where the CPU accepts the automatic color determination mode, it carries out color determination of the above described original. Then, in step ST202, the main CPU 61 accepts selection of the original mode. The main CPU 61 determines the image mode based on the setting or determination made in step ST201 and step ST202. If the original is a color printing original, processing goes to the step ST204. If the original is a monochromatic original, processing goes to the step ST211.

In the step ST203, the main CPU 61 selects and sets a color mode as a mode for processing image data. The processing in the color mode image processing steps ST205 to ST210 is executed in a similar manner as that in the above described steps ST105 to ST110.

In the step ST209, the main CPU 61 selects and sets a monochrome mode as a mode for processing image data. The monochrome mode image processing steps ST212 to ST217 are executed in a similar manner as in the above steps ST119 to ST124.

A proper image processing section is selected according to the user specification from a plurality of the thus preset image processing sections, or according to the automatically color-determined original type, whereby image processing can be applied to image data. In addition, when this processing is carried out, a suitable parameter can be set in each process, and thus, the quality of image formed at the printer section 3 can be improved.

THIRD EMBODIMENT

Figure 15:
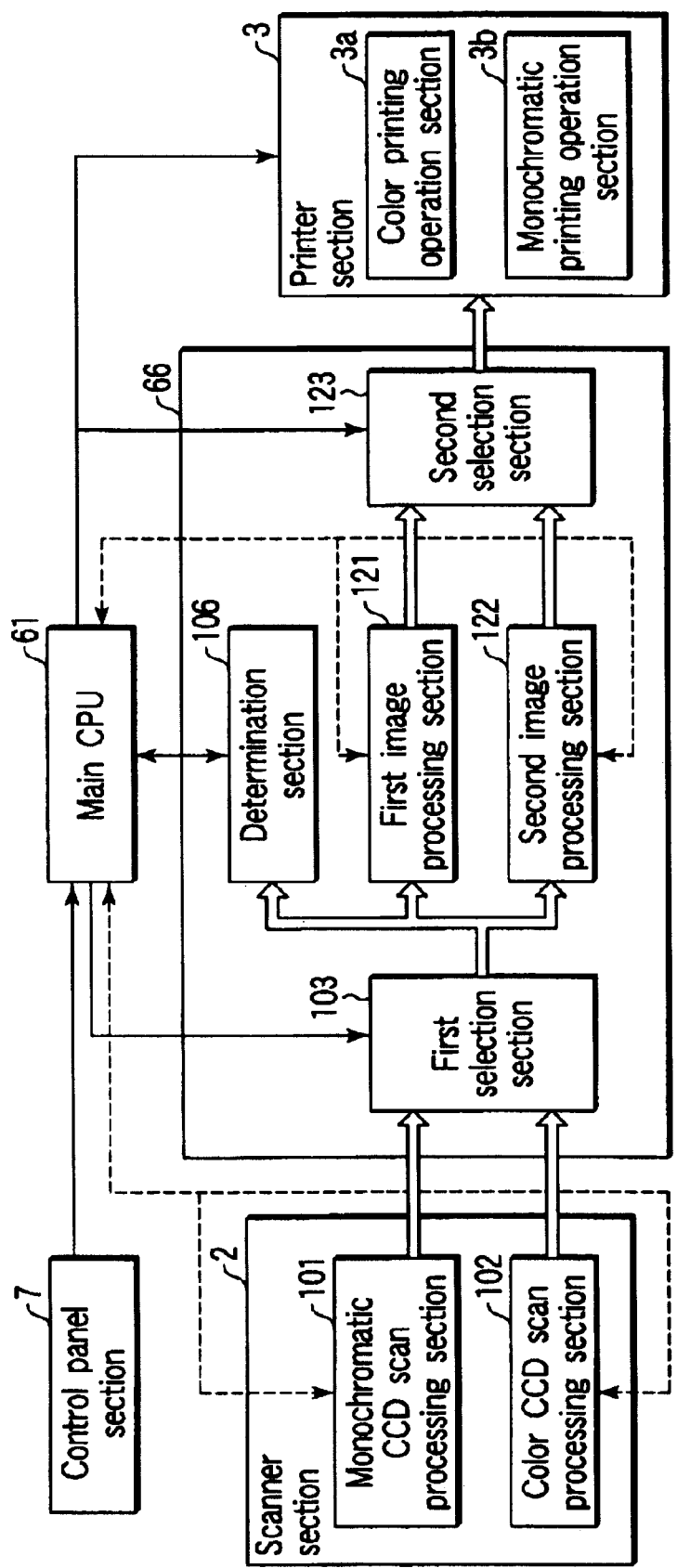
FIG. 15 is a diagram showing a configuration of an image processing according to a third embodiment of the present invention.

Now, a description will be given with respect to a third embodiment of the present invention. Like elements in the first embodiment described previously are designated by like reference numerals. A detailed description is omitted here. In the present embodiment, the image processing section 66 is constructed as shown in FIG. 15.

The configuration of the image processing section 66 will be described with reference to FIG. 15. The image data from the monochromatic CCD scan processing section 101 and color CCD scan processing section 102 provided at the scanner section 2 is outputted to the first selection section 103. At the first selection section 103, during pre-scanning, the image data from the color CCD scan processing section 102 is outputted to the determination section 106. During scanning, the first selection section 121 outputs any item of the inputted image data to the first image processing section 121 and the second image processing section 122. Then, both items of the image data processed at the first image processing section 121 and the second image processing section 122 are outputted to the second selection section 123. The second selection section 123 outputs any item of the inputted image data to the printer section 3. The first image processing section 122 and the second image processing section 123 may process image data by utilizing the compression/decompression section 67 or page memory 68 (not shown) or may be provided as a processing section including the compression/decompression section 67 or page memory 68.

Figure 16:
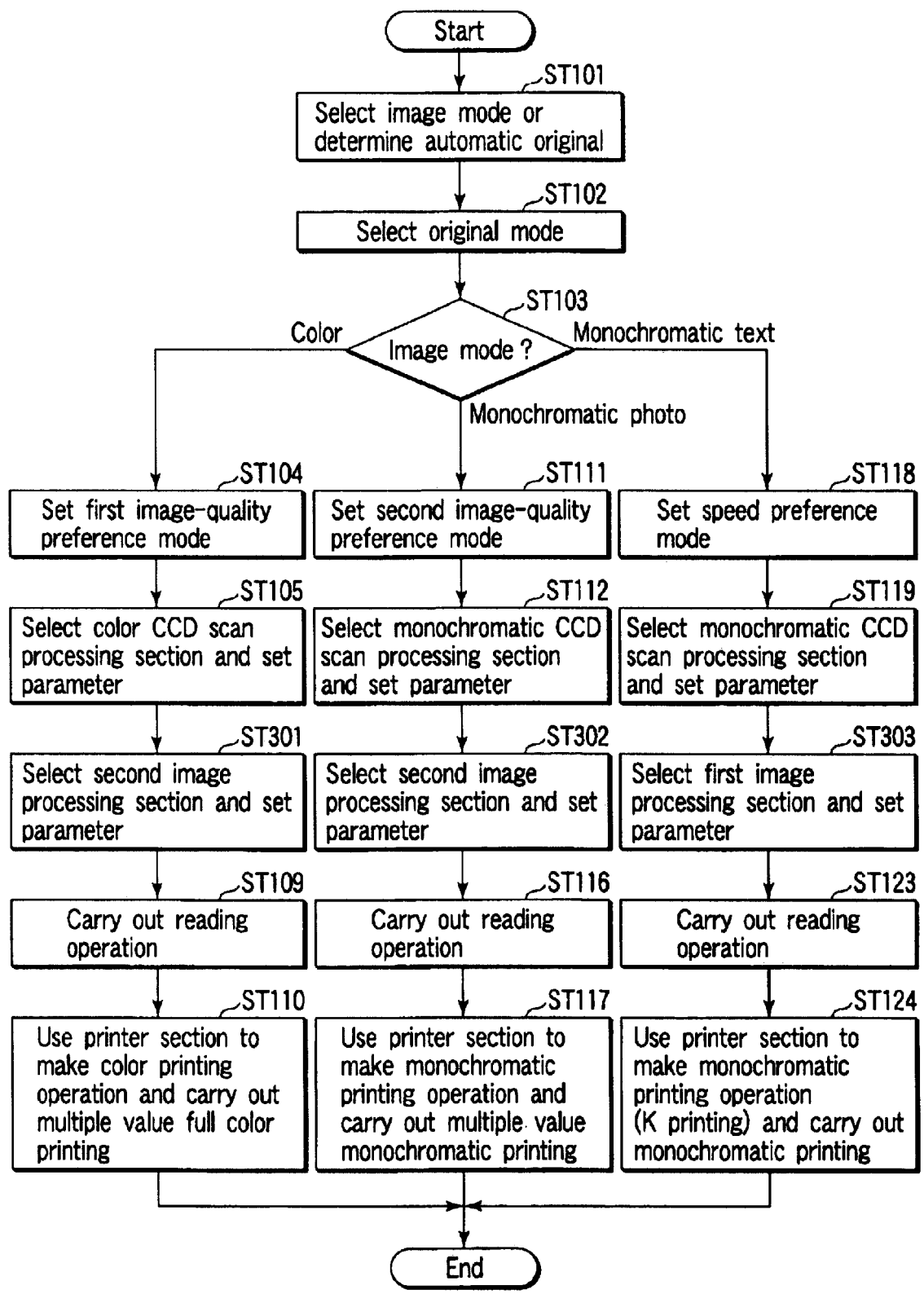
FIG. 16 is a flow chart showing an example of an image processing according to the third embodiment.

An example of image processing of the color digital copying machine 1 in which the image processing section has been thus constructed will be described with reference to a flow chart of FIG. 16.

Figure 13:
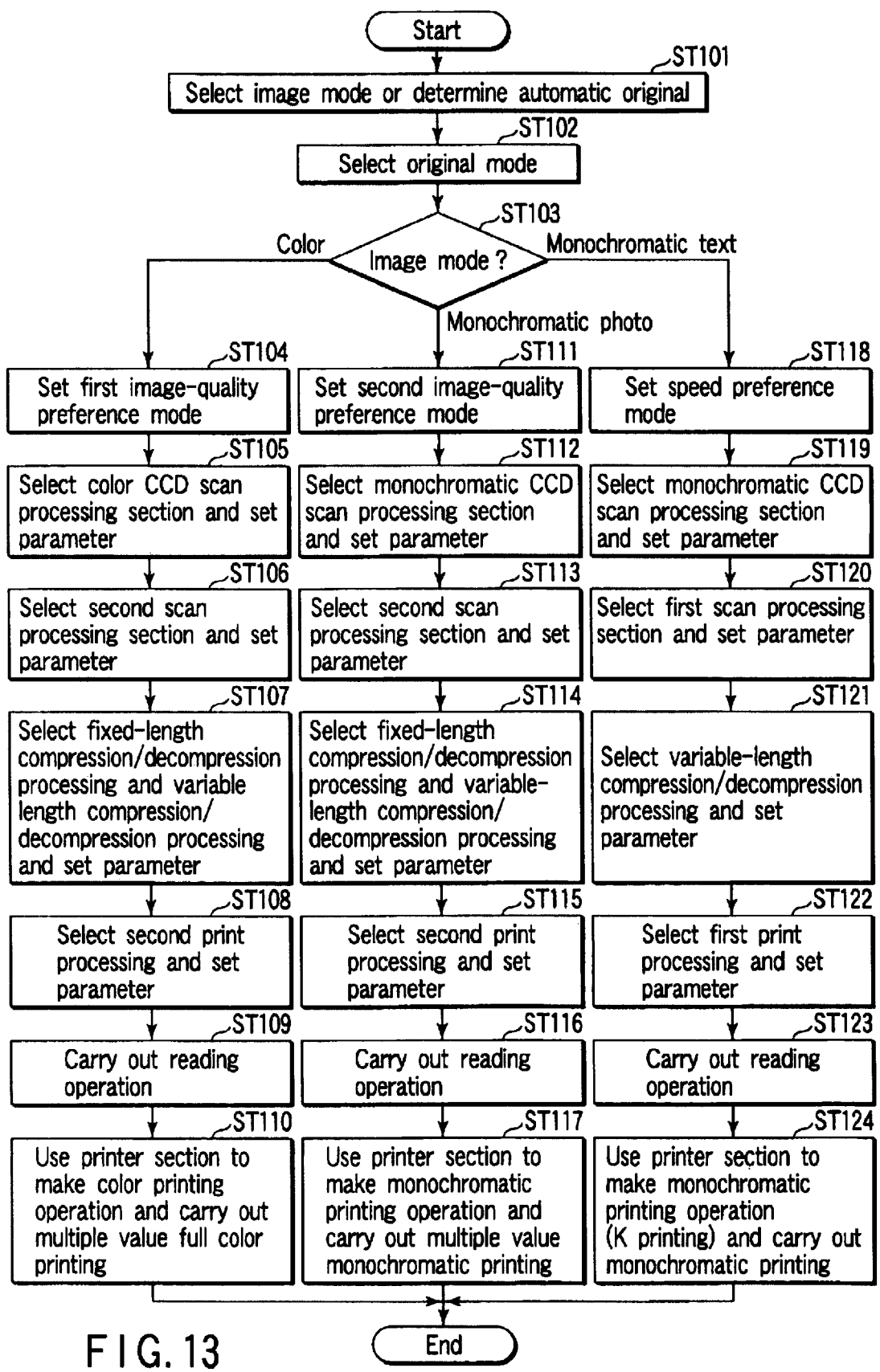
FIG. 13 is a flow chart showing an example of an image processing according to the first embodiment.
Figure 14:
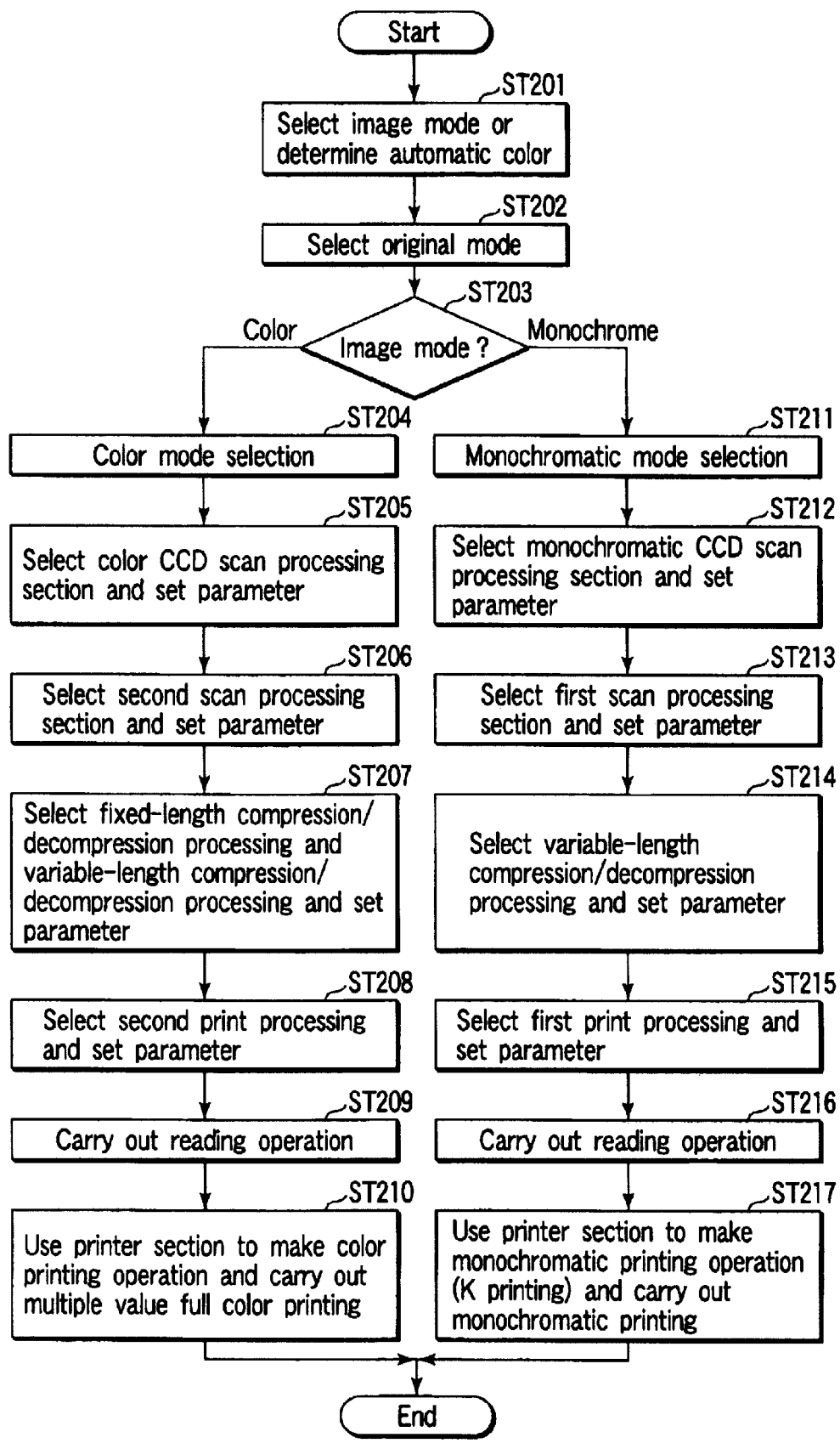
FIG. 14 is a flow chart showing an example of an image processing according to a second embodiment of the present invention.

The processing of the step ST301 is executed instead of that of the steps ST106, ST107, and ST108 described in the flow chart of FIG. 13. The processing of the step ST302 is executed instead of that of the steps ST113, ST114, and ST115. The processing of the step ST303 is executed instead of that of the steps ST120, ST121, and ST122.

In the step ST301, the main CPU 61 sets selection of the second image processing section 122 at the second selection section 123. Then, the main CPU selects a parameter for use in the second image processing section 122 from the parameter section 64, and sets the parameter. That is, a parameter suitable to processing color image data is set in order to carry out color conversion processing, filtering processing, density adjustment processing, background processing, discrimination processing, black-adding processing, half tone processing, and smoothing processing, for example.

In the step ST302, the main CPU 61 sets selection of the second image processing section 122 at the second selection section 123. Then, the main CPU 61 selects a parameter for use in the second image processing section 122 from the parameter section 64, and sets the parameter. That is, a parameter suitable to processing monochromatic photo image data is set in order to carry out color conversion processing, filtering processing, density adjustment processing, discrimination processing, half tone processing, or smoothing processing, for example.

In the step ST303, the main CPU 61 sets selection of the first image processing section 121 at the second selection section 123. Then, the main CPU selects a parameter for use in the first image processing section 121 from the parameter section 64, and sets the parameter. That is, a parameter suitable to processing monochromatic text image data is set in order to carry out filtering processing, density adjustment processing, range correction processing, half tone processing or smoothing processing, for example.

In this manner, the first image processing section 121 and the second image processing section 122 are provided at the image processing section 66, and an image processing section is selected according to the user specification from the control panel section 7 or according to the determination of the determination section 106, whereby proper image processing can be carried out.

In addition, in the third embodiment, although two processing sections, i.e., the first image processing section 121 and the second image processing section 122 are provided at the image processing section 66, three or more image processing sections may be provided or may be selected according to the user's instruction from the control panel section 7 at each selection section or according to the determination result of the determination section 106.

FOURTH EMBODIMENT

Now, a description will be given with respect to a fourth embodiment of the present invention. In this fourth embodiment, a configuration for carrying out automatic color determination is provided instead of original type determination of the third embodiment.

Figure 17:
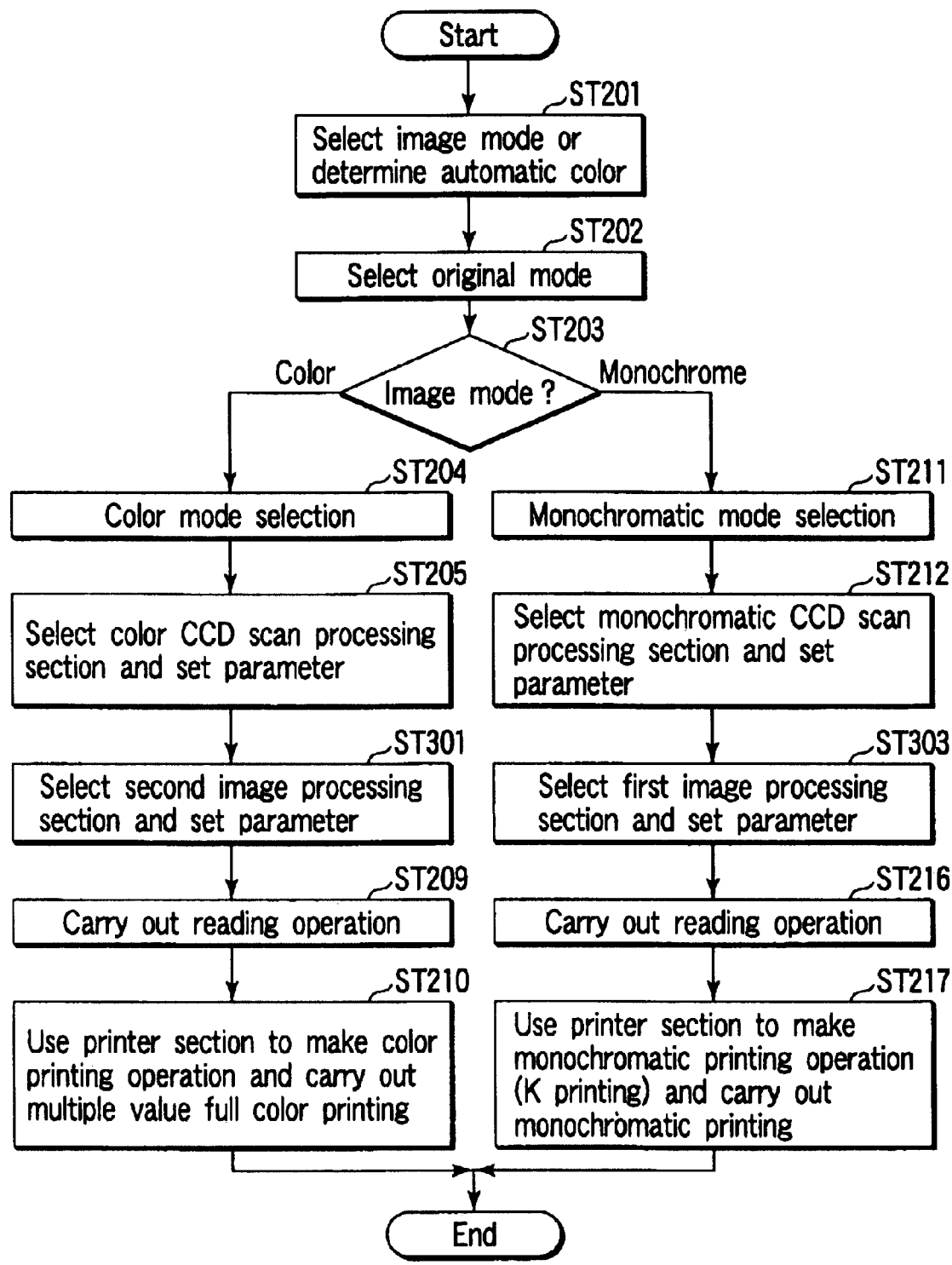
FIG. 17 is a flow chart showing an example of an image processing according to a fourth embodiment of the present invention.

In the fourth embodiment, as shown in a flow chart of FIG. 17, the processing of the step ST301 is executed instead of that of the steps ST206, ST207, and ST208 according to the second embodiment. Also, the processing of the step ST302 is executed instead of that of the steps ST211, ST212, and ST213.

In the fourth embodiment as well, the advantageous effects of the second and third embodiments can be achieved.

FIFTH EMBODIMENT

Figure 18:
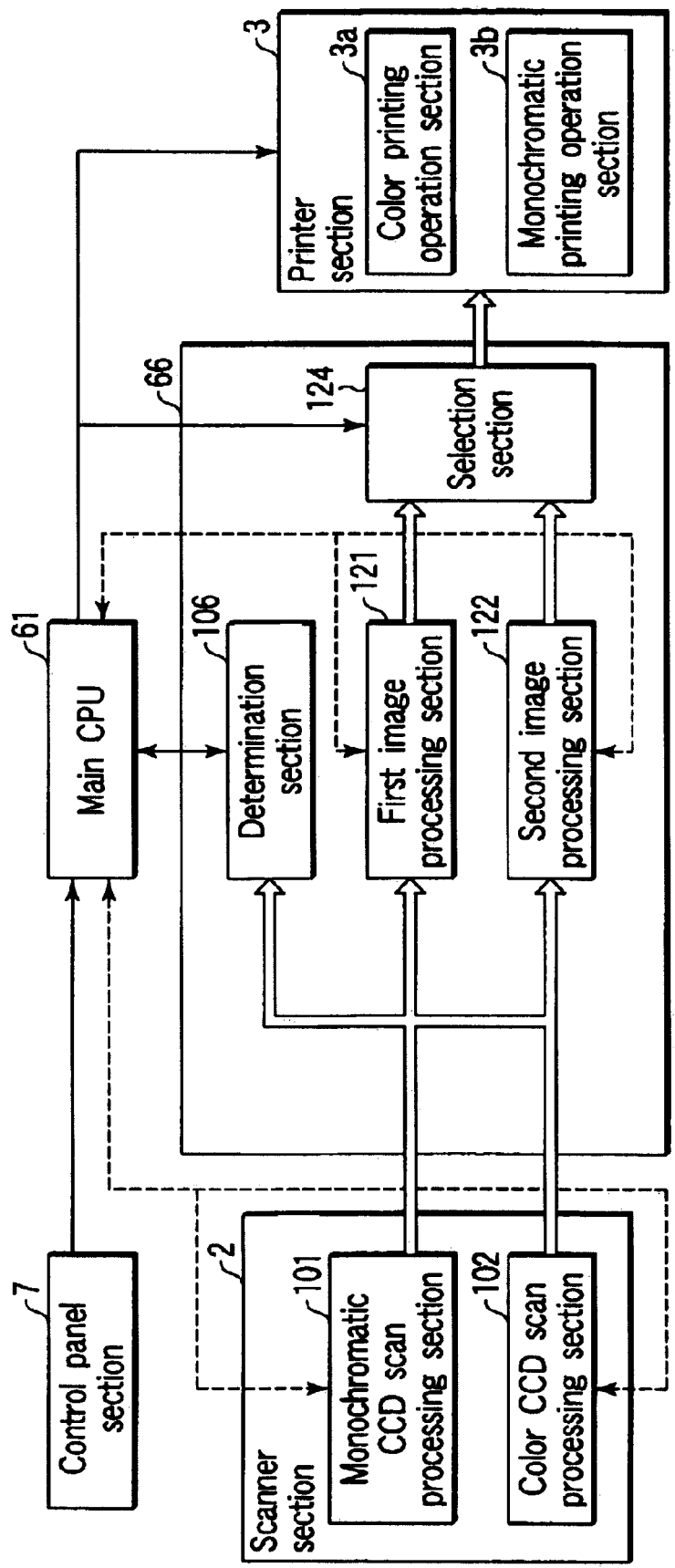
FIG. 18 is a view showing a configuration of an image processing according to a fifth embodiment of the present invention.

Now, a description will be given with respect to a fifth embodiment of the present invention. Like elements in the third embodiment described previously are designated by like reference numerals. A detailed description is omitted here. In the present embodiment, the image processing section 66 is constructed as shown in FIG. 18.

The configuration of the image processing section 66 will be described with reference to FIG. 18. During scanning, the image data from the monochromatic CCD scan processing section 101 provided at the scanner section 2 is outputted to the first image processing section 11, the image data from the color CCD scan processing section 102 is outputted to the second image processing section 122 and determination section 106, respectively, at the same time. The image data processed at the first image processing section 121 and second image processing section 122 both is outputted to the selection section 124. The selection section 124 outputs any item of the inputted image data to the printer section 3.

In addition, the first image processing section 121 and the second image processing section 122 are constructed to provide a storage section. This storage section is provided in order to temporarily store the image data processed at each image processing section until the determination result of the determination section 106 has been obtained based on the image data outputted during scanning. When an image processing section is selected based on the determination result of the determination section 106, the stored image data is sequentially outputted from the storage section to the printer section 3.

Figure 19:
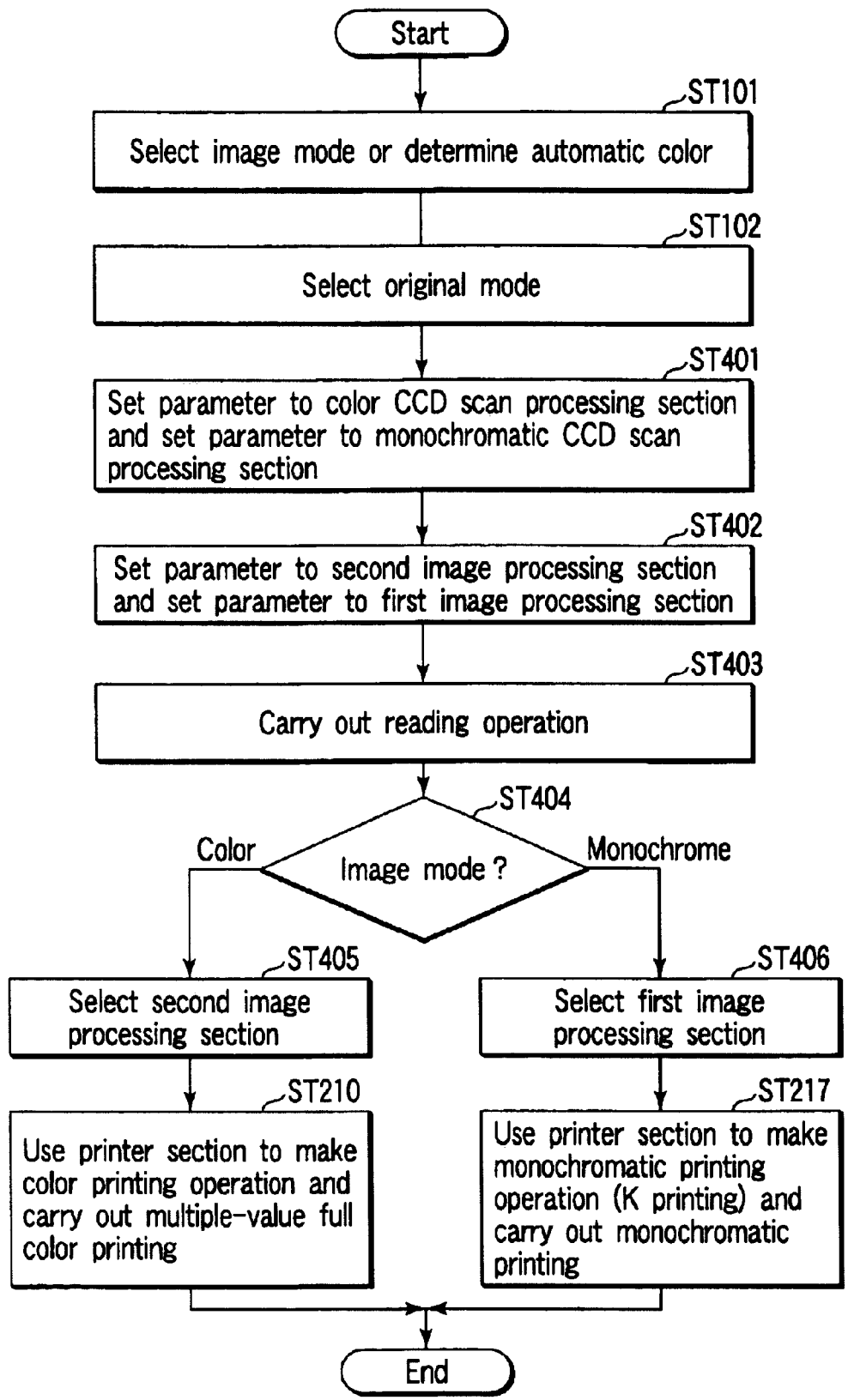
FIG. 19 is a flow chart showing an example of an image processing according to the fifth embodiment.

An example of image processing of the color digital copying machine 1 in which the image processing section has been thus constructed will be described with reference to a flow chart of FIG. 19.

The processing of the steps ST101 and ST102 described above is executed. That is, it is determined whether or not specification of original type is accepted or whether the original type is valid, and specification of the original mode is accepted.

Subsequently, in step ST401, the main CPU 61 provides parameter settings of the monochrome CCD scan processing section 101 and the color CCD scan processing section 102. In the step ST402, the main CPU provides parameter settings of the first image processing section 121 and second image processing section 122. After these parameter settings of each processing section have been provided, the main CPU 61 reads an image of an original by controlling the scanner section 2 in step ST403.

Then, in step ST404, the main CPU 61 determines the image mode based on the settings provided in steps ST101 and ST102. When the original is determined to be color, processing goes to the step ST405. When the original is determined to be monochromatic, processing goes to the step ST406.

In the step ST405, the main CPU 61 sets selection of the second image processing section 122 at the selection section 124. Therefore, the image data acquired at the color CCD scan processing section 102 by a reading operation is processed at the second image processing section 122, and the processed image data is outputted to the printer section 3. Then, the processing of the step ST210 described above is executed.

In the step ST406, the main CPU 61 sets selection of the first image processing section 121 at the selection section 124. Therefore, the image data acquired at the monochromatic CCD scan processing section 101 by a reading operation is processed at the first image processing section 121, and the processed image data is outputted to the printer section 3. Then, the processing of the step ST217 described above is executed.

With such a configuration, a reading operation of an original image is started before carrying out mode determination, and image data processing can be carried out. Accordingly, an original image reading operation can be started immediately.

In this manner, the image data processed at the color scan CCD processing section 102 and monochromatic CCD scan processing section 101 both is outputted at the same time. Thus, there is no need to provide a selection section for selecting image data to be outputted to the first image processing section 121 and the second image processing section 122. Therefore, the configuration of the image processing section 66 can be simplified. Further, an original can be determined without carrying out pre-scanning.

SIXTH EMBODIMENT

Figure 20:
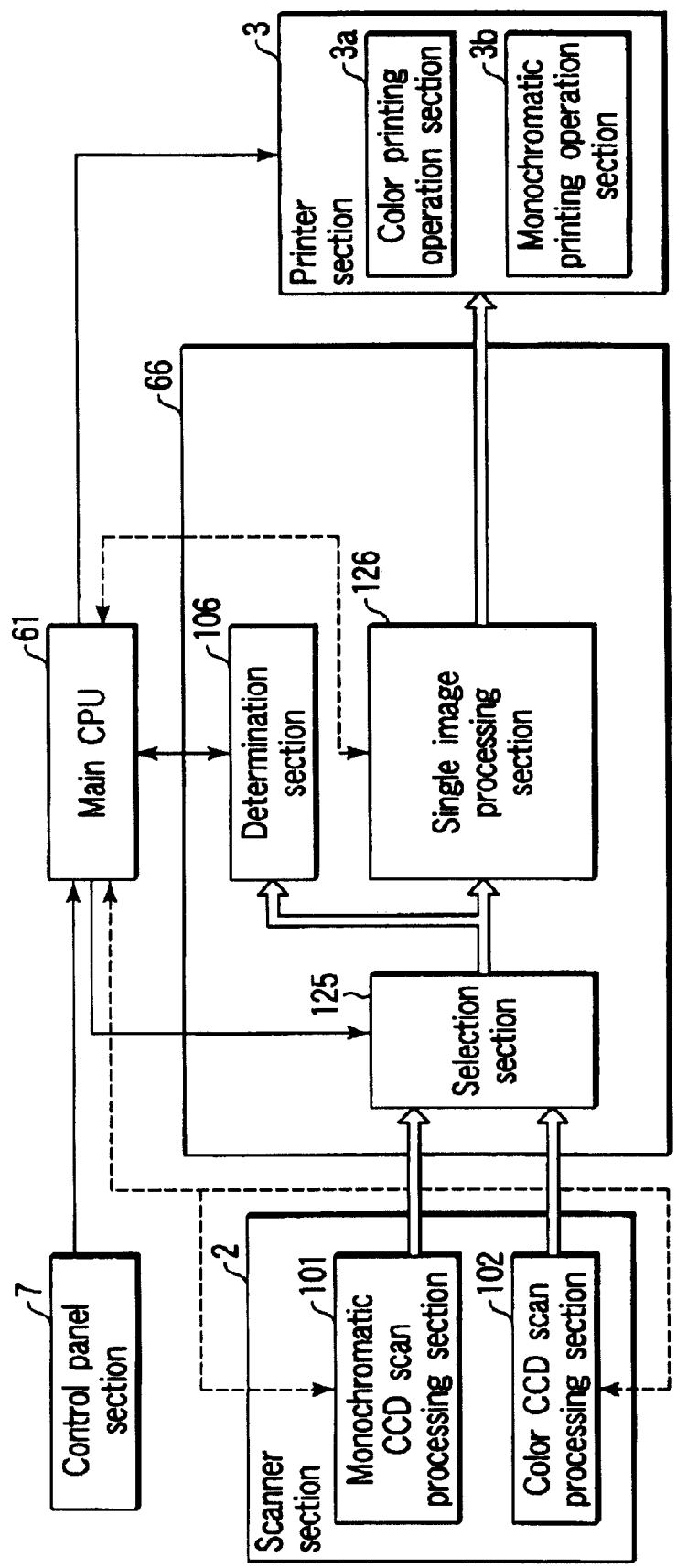
FIG. 20 is a view showing a configuration of an image processing according to a sixth embodiment of the present invention.

Now, a description will be given with respect to a sixth embodiment of the present invention. Like elements of the fourth embodiment described previously are designated by like reference numerals. A detailed description is omitted here. In the present embodiment, the image processing section 66 is constructed as shown in FIG. 20.

The image processing section 66 is constructed to provide a first selection section 125 for selecting the image data processed at the monochromatic CCD scan processing section 101 and color CCD scan processing section 102. The image data outputted from the first selection section 125 is outputted to the determination section 106 during pre-scanning, and is outputted to a single image processing section 126 during scanning. The image data outputted from such single image processing section 126 is outputted to the printer section 3. The single image processing section 126 can carry out a plurality of image processes by selecting a parameter for use in each image processing stored in the parameter section 64 of the ROM 62. For example, if a parameter (a first parameter) for monochromatic image data processing is selected and set, a monochromatic image data processing section is available.

If a parameter (a second parameter) for color image data processing is selected and set, a color image data processing section is available.

Figure 21:
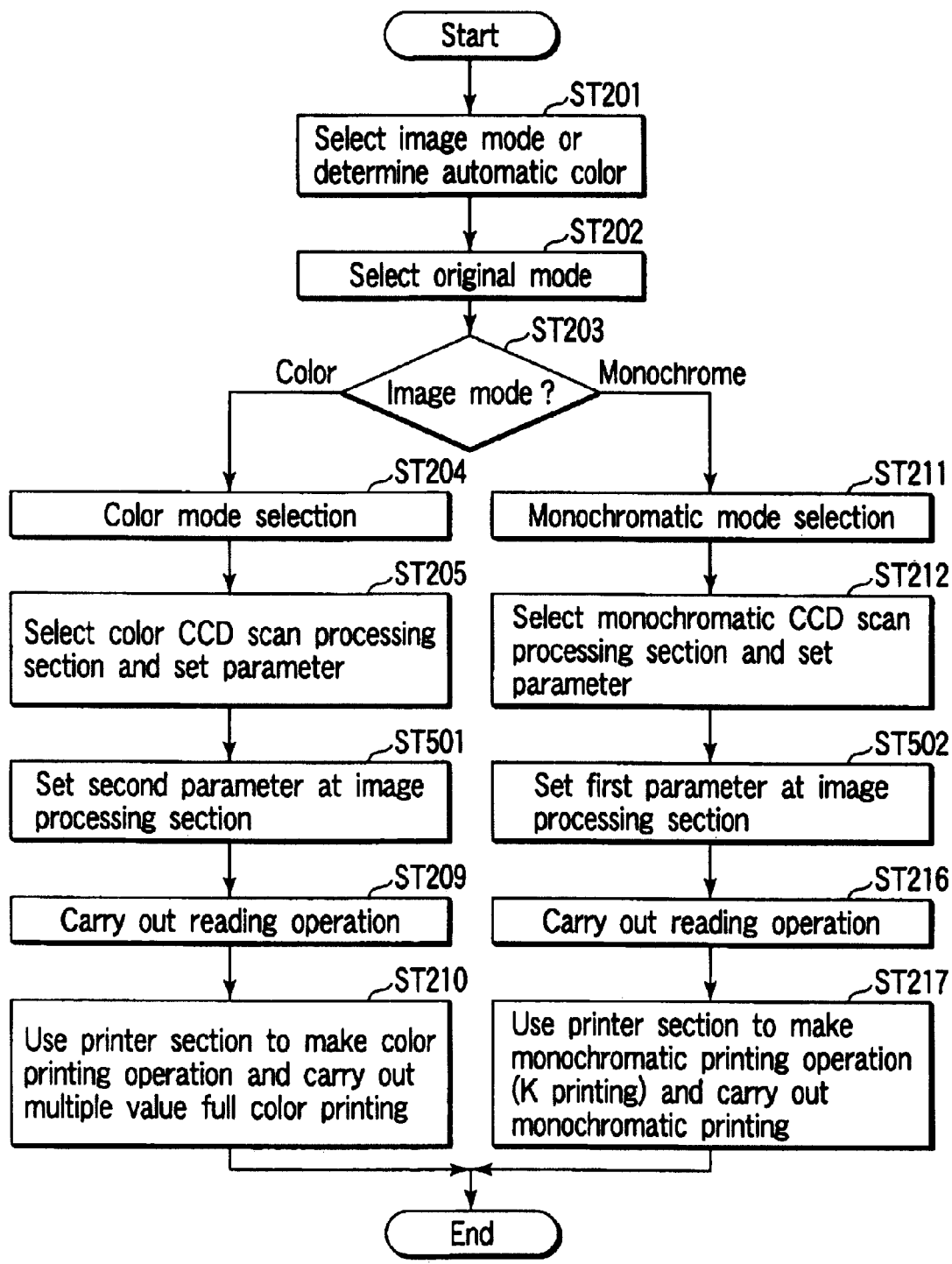
FIG. 21 is a flow chart showing an example of an image processing according to the sixth embodiment.

An example of image processing of the color digital copying machine 1 in which the image processing section 66 has been thus constructed will be described with reference to a flow chart of FIG. 21. The processing of the step ST301 in the flow chart shown in FIG. 17 corresponds to that of the step ST501, and the processing of the step ST303 corresponds to that of the step ST502.

In the step ST501, the main CPU 61 sets the second parameter at the image processing section 126. In addition, in step ST502, the main CPU 61 sets the first parameter at the image processing section 126.

Therefore, the main CPU 61 can select and set the first and second parameters for use in image processing of the single image processing section 126 by the user's specification from the control panel section 7 or according to the determination result of the determination section 106. Accordingly, image processing according to the original type can be carried out with a simplified configuration having one selection section 125 and a single image processing section 126.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:

an image reading section which acquires image data from an original;

an image processing section which applies a predetermined process to the acquired image data and outputs first image data to which the process has been applied or which applies one of two or more different processes including the predetermined process to the acquired image data and outputs second image data to which the process has been applied;

a printer section which makes a predetermined printing operation or one of two or more different printing operations including the predetermined printing operation;

at least one of an operating section which accepts a mode specification and a determination section which determines an original type;

a control section which controls at least any one of the first image data and the second image data based on specification of the operating section or determination of the determination section to be printed in any one of the first printing operation and the second printing operation; and a compression/decompression section which compresses or decompresses at least any one of the first image data and the second image data by any one of a first compression/decompression scheme and a second compression/decompression scheme, wherein the control section further causes any one of the first image data and the second image data to be compressed or decompressed by any one of the first compression/decompression scheme and the second compression/decompression scheme based on the specification of the operation section or the determination of the determination section, and wherein the first compression/decompression scheme is a process for carrying out a fixed compression/decompression processing, and the second compression/decompression scheme is a process for carrying out the fixed-length compression/decompression processing and a variable-length compression/decompression which carries out compression/decompression processing according to the original.

2. An image forming apparatus according to claim 1, wherein the image reading section has a plurality of sensors with their different features.

3. An image forming apparatus according to claim 2, further comprising a scan processing section which processes image data acquired at the image reading section,
   wherein the image reading section has a color image reading section and a monochromatic image reading section,
   the scan processing section has a color CCD scan processing section acquired from the color image reading section and a monochromatic CCD scan processing section acquired at the monochromatic image reading section, and
   the control section selects image data processed at any one of the color CCD scan processing section and monochromatic CCD scan processing section based on the specification of the operation section or the determination of the determination section and outputs the selected image data to the image processing section.

4. An image forming apparatus according to claim 1, wherein the image processing section has a first process for processing the acquired image data in M bits at a first processing velocity V1 and a second process for processing the acquired image data in N (M<N) bits at a second processing velocity V2 (V1>V2).

5. An image forming apparatus according to claim 1, wherein the image processing section generates third image data obtained by applying a predetermined process to at least any one of the decompressed first image data and second image data or fourth image data obtained by applying a process different from the predetermined process to at least any one of the decompressed first image data and second image data, and wherein the control section further outputs any one of the third image data and fourth image data based on the specification of the operation section or the determination of the determination section.

6. An image forming method, comprising:
   accepting a mode specification or determining an original type;
   acquiring image data from an original;
   applying a predetermined process to the acquired image data and outputting first image data to which the process has been applied or applying to the image data one of two or more different processes including the predetermined process and outputting second image data to which the process has been applied;
   compressing or decompressing at least any one of the first image data and the second image data by any one of a first compression/decompression scheme and a second compression/decompression scheme, the first compression/decompression scheme being a process for carrying out a fixed compression/decompression processing, and the second compression/decompression scheme being a process for carrying out the fixed-length compression/decompression processing and a variable-length compression/decompression which carries out compression/decompression processing varying according to the original; and
   making a predetermined printing operation or one of two or more different printing operations including the predetermined printing operation based on the specification or the determination.

* * * * *